United States Patent
Yokoyama et al.

(10) Patent No.: US 9,438,771 B2
(45) Date of Patent: Sep. 6, 2016

(54) IMAGE PROCESSING APPARATUS, IMAGE PICKUP APPARATUS, IMAGE PICKUP SYSTEM, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Takayoshi Yokoyama, Utsunomiya (JP); Koshi Hatakeyama, Tokyo (JP); Takashi Oniki, Chikusei (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 47 days.

(21) Appl. No.: 14/507,207

(22) Filed: Oct. 6, 2014

(65) Prior Publication Data

US 2015/0097994 A1    Apr. 9, 2015

(30) Foreign Application Priority Data

Oct. 8, 2013   (JP) ................................ 2013-210726
May 22, 2014   (JP) ................................ 2014-106400

(51) Int. Cl.
*H04N 5/217* (2011.01)
*H04N 5/357* (2011.01)
*H04N 9/04* (2006.01)

(52) U.S. Cl.
CPC ............ *H04N 5/217* (2013.01); *H04N 5/3572* (2013.01); *H04N 9/045* (2013.01)

(58) Field of Classification Search
None
See application file for complete search history.

(56) References Cited

U.S. PATENT DOCUMENTS

| | | |
|---|---|---|
| 6,724,702 B2 | 4/2004 | Taguchi et al. |
| 7,953,263 B2 | 5/2011 | Okamoto et al. |
| 8,866,937 B2 | 10/2014 | Kano |

(Continued)

FOREIGN PATENT DOCUMENTS

| | | |
|---|---|---|
| CN | 102685511 A | 9/2012 |
| CN | 102833461 A | 12/2012 |

(Continued)

OTHER PUBLICATIONS

Schuler et al., "Non-stationary Correction of Optical Aberrations", Computer Vision (ICCV), 2011 IEEE International Conference on, IEEE, Nov. 6, 2011, pp. 659-666, XP032101254. Cited in counterpart appln. No. EP14187886.8, dated Feb. 18, 2015.

(Continued)

*Primary Examiner* — Albert Cutler
(74) *Attorney, Agent, or Firm* — Rossi, Kimms & McDowell LLP

(57) ABSTRACT

An image processing apparatus (100) includes a detection unit (102) configured to detect a first region in which one of a signal level of a color plane corresponding to at least one color filter of an image acquired from an image pickup element including a plurality of color filters and a signal level of a brightness plane generated from the image monotonically increases or monotonically decreases in a first direction in a predetermined section, a determination unit (103) configured to determine a second region in which color bleeding occurs, based on optical information on the color bleeding of an image pickup optical system and information on the first region, and a correction unit (104) configured to correct the image so as to reduce the color bleeding.

24 Claims, 20 Drawing Sheets

(56) References Cited

U.S. PATENT DOCUMENTS

| | | |
|---|---|---|
| 9,007,482 B2 | 4/2015 | Hatakeyama et al. |
| 9,100,583 B2 | 8/2015 | Oniki et al. |
| 2005/0094896 A1* | 5/2005 | Masumura ............ H04N 5/217 382/276 |
| 2007/0103744 A1 | 5/2007 | Chiba |
| 2009/0074324 A1* | 3/2009 | Ishiga .................... H04N 9/045 382/282 |
| 2009/0273690 A1 | 11/2009 | Nashizawa |
| 2010/0074520 A1 | 3/2010 | Kinoshita |
| 2011/0234858 A1* | 9/2011 | Saito ...................... H04N 9/646 348/234 |
| 2012/0002113 A1 | 1/2012 | Nishio et al. |
| 2012/0014599 A1* | 1/2012 | Kano ...................... G06T 5/006 382/167 |
| 2012/0154626 A1* | 6/2012 | Hatakeyama .......... H04N 9/646 348/223.1 |
| 2012/0212644 A1* | 8/2012 | Nashizawa ............. G06T 5/006 348/223.1 |
| 2013/0010158 A1 | 1/2013 | Watanabe |

FOREIGN PATENT DOCUMENTS

| | | |
|---|---|---|
| CN | 103259976 A | 8/2013 |
| EP | 1825810 A1 | 8/2007 |
| EP | 2111038 A1 | 10/2009 |
| EP | 2490174 A2 | 8/2012 |
| EP | 2557536 A2 | 2/2013 |
| JP | 2007133592 A | 5/2007 |
| JP | 2009268033 A | 11/2009 |
| JP | 2010081263 A | 4/2010 |
| JP | 2012235421 A | 11/2012 |

OTHER PUBLICATIONS

European Search Report issued in European counterpart application No. 14187886.8, dated Feb. 18, 2015.
Kim et al. "Optimal Unsharp Mask for Image Sharpening and Noise Removal", Journal of Electronic Imaging, SPIE/IS & T, vol. 14, No. 2, Apr. 1, 2005, pp. 23005-23001, XP001237090. Cited in U.S. Appl. No. 14/508,199.
Loo et al. "Investigation of Basic Imaging Properties in Digital Radiography. 4. Effect of Unsharp Masking on the Detectability of Simple Patterns", Medical Physics, vol. 12, No. 2, Jan. 1, 1985, p. 209, XP0055169486. Cited in U.S. Appl. No. 14/508,199.
European Search Report issued in EP14188071.6, dated Feb. 20, 2015, cited in U.S. Appl. No. 14/508,199.
Extended European Search Report issued in EP14188071.6, mailed Jul. 31, 2015.
Office Action issued in Chinese Appln. No. 2014105244712, mailed Mar. 3, 2016. English translation provided.

* cited by examiner

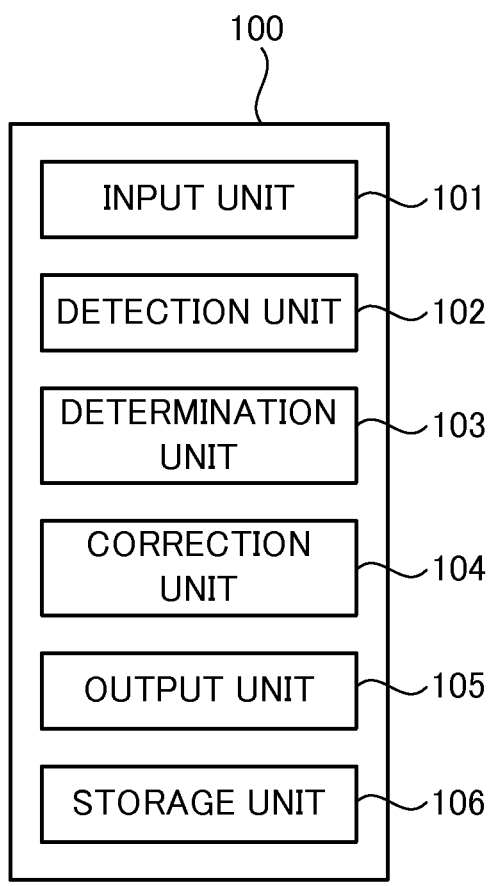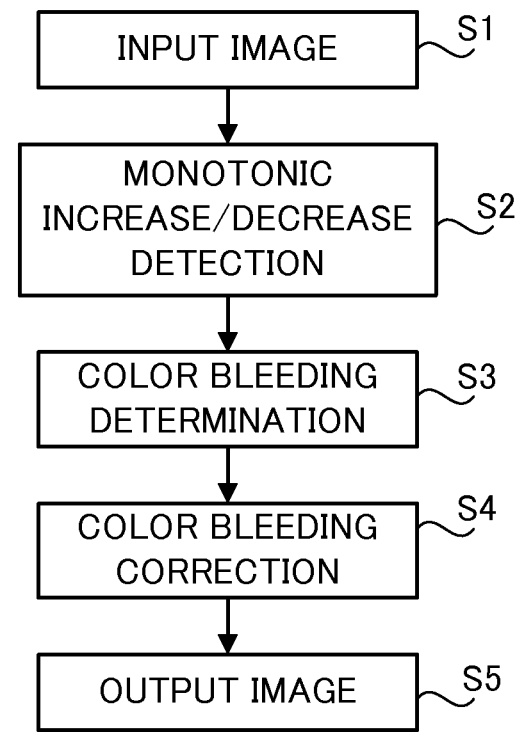
FIG. 1A
FIG. 1B

CORRECTLY DETERMINE COLOR BLEEDING

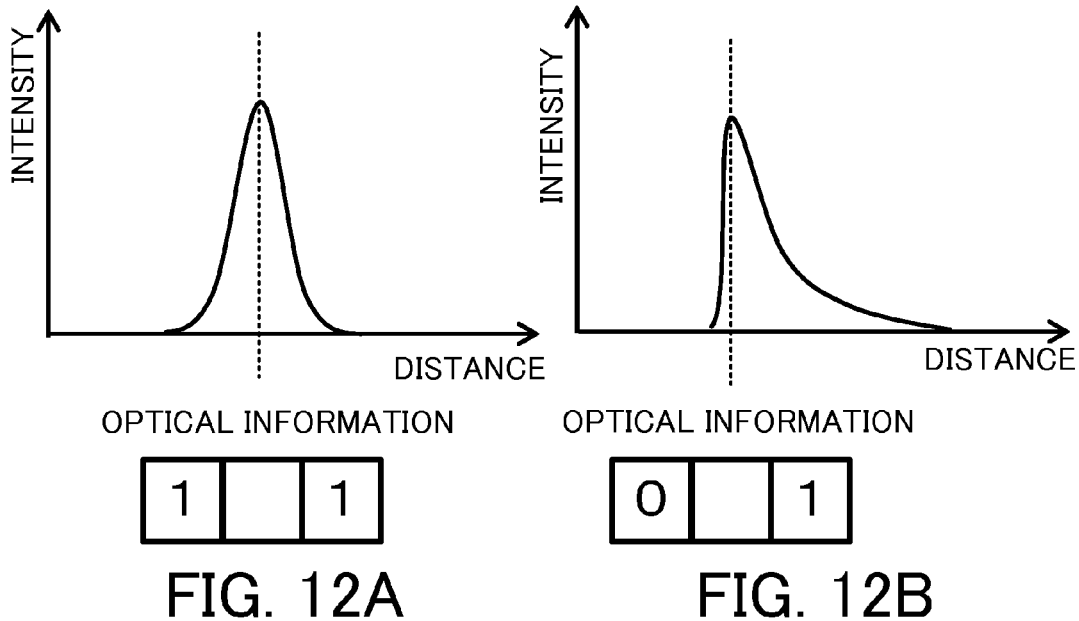
FIG. 12A
FIG. 12B
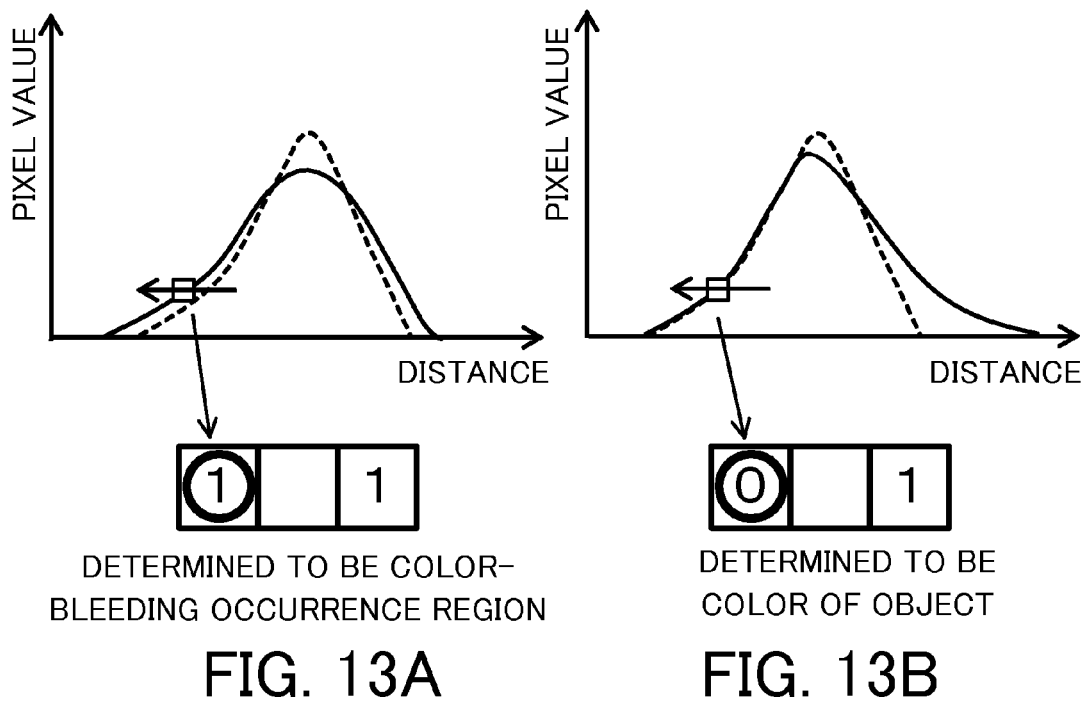
DETERMINED TO BE COLOR-BLEEDING OCCURRENCE REGION
FIG. 13A
DETERMINED TO BE COLOR OF OBJECT
FIG. 13B

| 0 | 0 | 1 |
|---|---|---|
| 0 | 1 | 1 |
| 0 | 1 | 1 |

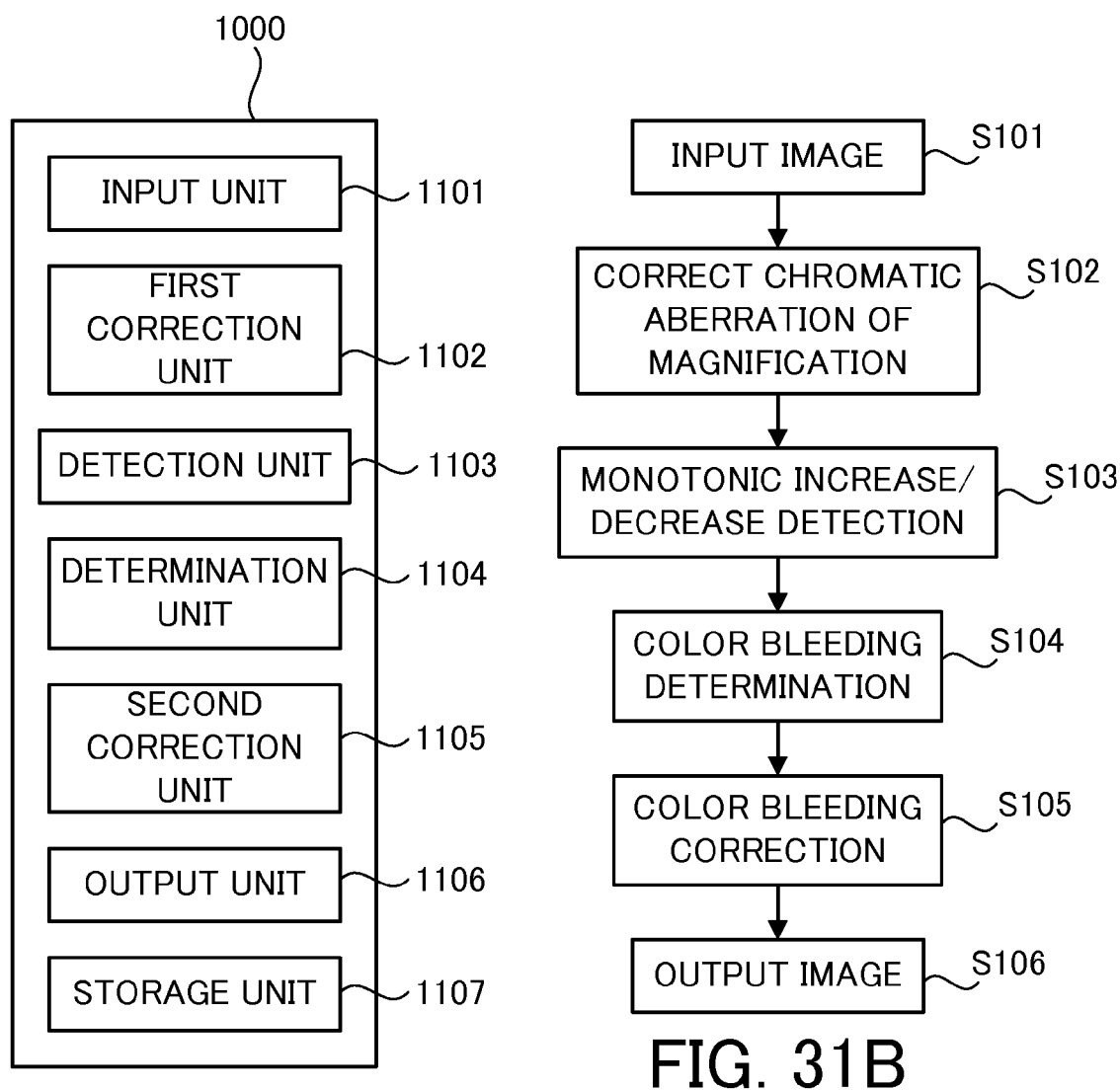

IMAGE PROCESSING APPARATUS, IMAGE PICKUP APPARATUS, IMAGE PICKUP SYSTEM, IMAGE PROCESSING METHOD, AND NON-TRANSITORY COMPUTER-READABLE STORAGE MEDIUM

BACKGROUND OF THE INVENTION

1. Field of the Invention

The present invention relates to an image processing apparatus which reduces color bleeding in a color image.

2. Description of the Related Art

Conventionally, a color which does not originally exist has sometimes appeared as color bleeding at the periphery of a bright portion of a color image due to a chromatic aberration caused by an image pickup optical system. The chromatic aberration caused by the image pickup optical system can be optically reduced to some extent by using a combination of a plurality of lenses including materials with dispersions different from each other. However, recent progress in reduction in size of an image pickup apparatus has required an increase in resolution of a sensor for use in an image pickup element and reduction in size of the image pickup optical system, which makes it difficult to sufficiently suppress the chromatic aberration with a configuration of the image pickup optical system.

The chromatic aberration is broadly classified into a transverse chromatic aberration (a chromatic aberration of magnification) and a longitudinal chromatic aberration (an axial chromatic aberration). The transverse chromatic aberration is a phenomenon in which an imaging position is displaced in a direction along an image plane depending on a wavelength. The longitudinal chromatic aberration is a phenomenon in which the imaging position is displaced in a direction along an optical axis depending on a wavelength. As disclosed in U.S. Pat. No. 6,724,702, the transverse chromatic aberration can be corrected by geometric conversion which adds different distortions to color planes, namely, R (red), G (green), and B (blue). On the other hand, the longitudinal chromatic aberration cannot be corrected by the above-mentioned geometric conversion.

Japanese Patent Laid-Open No. ("JP") 2007-133592 discloses a method of calculating a correction amount by searching a region in which the G (green) plane is saturated taking advantage of a characteristic that the color bleeding mainly occurs at the periphery of blown-out highlights (a previously-set signal saturation region) and then integrating pixels arranged in regions surrounding the region. JP 2009-268033 discloses a method of determining, as a color-bleeding region, any region in which a pixel value of each color plane in the color image monotonically increases or monotonically decreases and then eliminating such color bleeding.

However, the method disclosed in JP 2007-133592 causes the color bleeding which gives a user a feeling of strangeness also in a region in which the blown-out highlights do not occur, which means that the color bleeding is insufficiently corrected. On the other hand, the method disclosed in JP 2009-268033 can correct the color bleeding also in the region in which the blown-out highlights do not occur. However, since the color bleeding occurs due to the aberration caused by the image pickup optical system, the image pickup optical system which causes an asymmetrical aberration such as coma aberration makes an image of an object have or not have the color bleeding in some directions. When the object has the same type of color as that of the color bleeding, this method is likely to determine the color of the object as the color bleeding in error and thus to eliminate an original color of the object.

Moreover, in order to reduce the color bleeding more effectively, it is necessary to take into consideration the chromatic aberration of magnification caused due to manufacturing variations of the optical system, eccentricity adjustment and, the like.

SUMMARY OF THE INVENTION

The present invention provides an image processing apparatus capable of effectively reducing color bleeding in a color image, an image pickup apparatus, an image pickup system, an image processing method, and a non-transitory computer-readable storage medium.

An image processing apparatus as one aspect of the present invention includes a detection unit configured to detect a first region in which one of a signal level of a color plane corresponding to at least one color filter of an image acquired from an image pickup element including a plurality of color filters and a signal level of a brightness plane generated from the image monotonically increases or monotonically decreases in a first direction within a predetermined section, a determination unit configured to determine a second region in which color bleeding of an image pickup optical system occurs, based on optical information on the color bleeding of and information on the first region, and a correction unit configured to correct the image so as to reduce the color bleeding.

An image processing apparatus as another aspect of the present invention includes a first correction unit configured to correct a chromatic aberration of magnification of a shot image, a detection unit configured to detect a first region in which a level of at least one of a color signal and a brightness signal of the shot image in which the chromatic aberration of magnification has been corrected monotonically increases or monotonically decreases in a first direction within a predetermined section, a determination unit configured to determine a second region in which color bleeding of an image pickup optical system occurs, based on optical information on the color bleeding and information on the first region, and a second correction unit configured to correct the shot image in which the chromatic aberration of magnification has been corrected, so as to reduce the color bleeding.

An image pickup apparatus as another aspect of the present invention includes an image pickup element configured to photoelectrically convert an optical image, a detection unit configured to detect a first region in which one of a signal level of a color plane corresponding to at least one color filter of an image acquired from the image pickup element including a plurality of color filters and a signal level of a brightness plane generated from the image monotonically increases or monotonically decreases in a first direction within a predetermined section, a determination unit configured to determine a second region in which color bleeding of an image pickup optical system occurs, based on optical information on the color bleeding and information on the first region, and a correction unit configured to correct the image so as to reduce the color bleeding.

An image pickup apparatus as another aspect of the present invention includes an image pickup element configured to photoelectrically convert an optical image to output a shot image, a first correction unit configured to correct a chromatic aberration of magnification of the shot image, a detection unit configured to detect a first region in which a level of at least one of a color signal and a brightness signal of the shot image in which the chromatic aberration of magnification has been corrected monotonically increases or monotonically decreases in a first direction within a predetermined section, and a second correction unit configured to correct the shot image in which the chromatic aberration of magnification has been corrected, so as to reduce the color bleeding.

An image pickup system as another aspect of the present invention includes a lens apparatus including an image pickup optical system and the image pickup apparatus.

An image processing method as another aspect of the present invention includes the steps of detecting a first region in which one of a signal level of a color plane corresponding to at least one color filter of an image acquired from an image pickup element including a plurality of color filters and a signal level of a brightness plane generated from the image monotonically increases or monotonically decreases in a first direction within a predetermined section, determining a second region in which color bleeding of an image pickup optical system occurs, based on optical information on the color bleeding and information on the first region, and correcting the image so as to reduce the color bleeding.

An image processing method as another aspect of the present invention includes the steps of correcting a chromatic aberration of magnification of a shot image, detecting a first region in which a level of at least one of a color signal and a brightness signal of the shot image in which the chromatic aberration of magnification has been corrected monotonically increases or monotonically decreases in a first direction within a predetermined section, determining a second region in which color bleeding of an image pickup optical system occurs, based on optical information on the color bleeding and information on the first region, and correcting the shot image in which the chromatic aberration of magnification has been corrected, so as to reduce the color bleeding.

A non-transitory computer-readable storage medium as another aspect of the present invention stores an image processing program configured to cause a computer to execute a process comprising the steps of detecting a first region in which one of a signal level of a color plane corresponding to at least one color filter of an image acquired from an image pickup element including a plurality of color filters and a signal level of a brightness plane generated from the image monotonically increases or monotonically decreases in a first direction within a predetermined section, determining a second region in which color bleeding of an image pickup optical system occurs, based on optical information on the color bleeding and information on the first region, and correcting the image so as to reduce the color bleeding.

A non-transitory computer-readable storage medium as another aspect of the present invention stores an image processing program configured to cause a computer to execute a process comprising the steps of correcting a chromatic aberration of magnification of a shot image, detecting a first region in which a level of at least one of a color signal and a brightness signal of the shot image in which the chromatic aberration of magnification has been corrected monotonically increases or monotonically decreases in a first direction within a predetermined section, determining a second region in which color bleeding of an image pickup optical system occurs, based on optical information on the color bleeding and information on the first region, and correcting the shot image in which the chromatic aberration of magnification has been corrected, so as to reduce the color bleeding.

Further features and aspects of the present invention will become apparent from the following description of exemplary embodiments with reference to the attached drawings.

BRIEF DESCRIPTION OF THE DRAWINGS

FIG. 1A is a block diagram of an image processing apparatus in this embodiment.

FIG. 1B is a flowchart illustrating an image processing method in this embodiment.

FIGS. 12A and 12B are explanatory diagrams of optical information in this embodiment.

FIGS. 13A and 13B are diagrams illustrating an example of determining a color bleeding region based on the optical information and a result of the monotonic increase/decrease detection in this embodiment.

FIG. 31A is a block diagram of an image processing apparatus in the third embodiment.

FIG. 31B is a flowchart illustrating an image processing method in the third embodiment.

DESCRIPTION OF THE EMBODIMENTS

Figure 2:
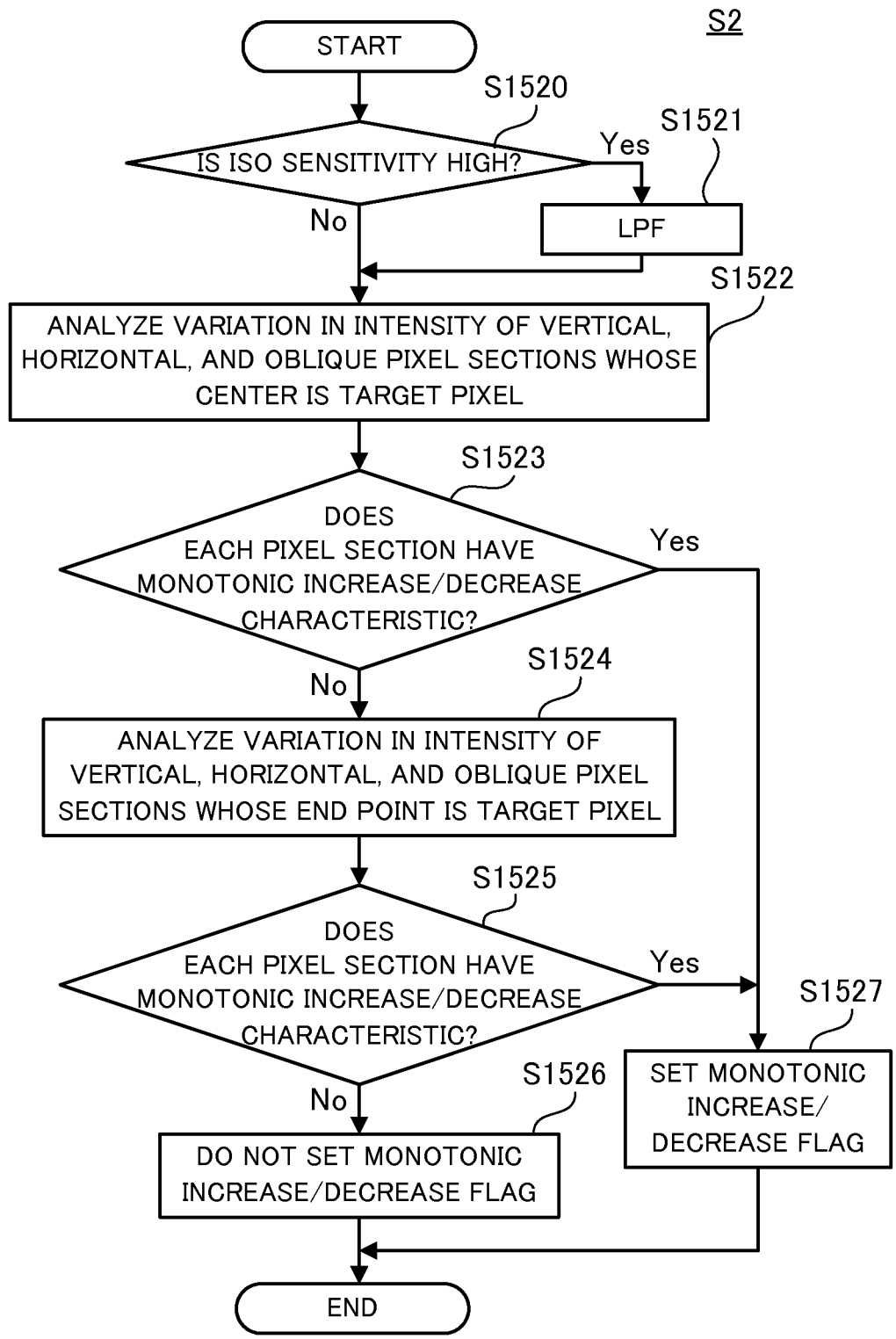
FIG. 2 is a flowchart illustrating monotonic increase/decrease determination processing in this embodiment.

Exemplary embodiments of the present invention will be described below with reference to the accompanied drawings.

First of all, referring to FIGS. 1A and 1B, an image processing apparatus and an image processing method will be described. FIG. 1A is a block diagram of an image processing apparatus 100 in this embodiment. FIG. 1B is a flowchart of the image processing method (an image processing program) in this embodiment. Each step of FIG. 1B is performed based on a command (an instruction) of the image processing apparatus 100, namely, by each unit of the image processing apparatus 100.

As illustrated in FIG. 1A, the image processing apparatus 100 includes an input unit 101, a detection unit 102, a determination unit 103, a correction unit 104 (a color-bleeding correction unit), and an output unit 105. First, at step S1 of FIG. 1B, the image processing apparatus 100 (the input unit 101) acquires a shot image as an input image. The input image is a digital image (the shot image) that an image pickup element acquires by receiving light via an image pickup optical system and is deteriorated due to aberrations (an axial chromatic aberration and the like) caused by the image pickup optical system. The image pickup optical system can be constituted not only by lenses, but also by mirrors (reflective surfaces) with a curvature.

A color component of the input image contains, for example, RGB color component information. In addition to this, a commonly-used color space such as lightness, hue, and saturation, which are denoted by LCH, and brightness and color-difference signal, which are denoted by YCbCr, can be selected and used as other color component. As other color spaces, XYZ, Lab, Yuv, and JCh can be used. Moreover, color temperature may also be used. The shot image can be acquired by connecting an image pickup apparatus and the image processing apparatus 100 by wire or wirelessly. The shot image can be also acquired via a non-transitory computer-readable storage medium.

Subsequently, at step S2, the image processing apparatus 100 (the detection unit 102) detects a region in which a pixel value (a signal level) of any of a plurality of color planes constituting the color image monotonically increases or monotonically decreases. Then, the detection unit 102 temporarily determines the detected region as a color-bleeding occurrence region (a monotonic increase/decrease detection process). There are several possible methods of determining the color-bleeding occurrence region in the monotonic increase/decrease detection process. In this embodiment, the determination is performed based on a variation characteristic of the pixel value of the color bleeding in a certain pixel section (a predetermined section).

Since the color bleeding occurs due to a displacement of an imaging position in a direction along an optical axis depending on a wavelength, when there occurs the color bleeding in blue, for example, this means that a blue color plane (a B plane) is out of focus (defocused). The color bleeding caused by defocus is present over the certain pixel section, and a variation in the pixel value of the color bleeding in such situation has a characteristic that it gradually decreases from a highlighted portion of the image to a shadow portion. Therefore, when the variation in the pixel value of the color bleeding in the certain pixel section has a characteristic that it monotonically increases or monotonically decreases, the section is temporarily determined to be the color-bleeding occurrence region because the color bleeding may be occurring.

As described above, in this embodiment, the image pickup element includes a plurality of color filters. The detection unit 102 detects the region (a first region) in which the signal level (the pixel value) of the color plane corresponding to at least one color filter of an image acquired from the image pickup element monotonically increases or monotonically decreases in a direction (a first direction) within the predetermined section. This embodiment is, however, not limited to this, and the detection unit 102 may alternatively be configured to detect a region in which, instead of the signal level of the color plane, the signal level of a brightness plane (a Y plane) generated from the image acquired from the image pickup element monotonically increases or monotonically decreases.

Incidentally, in actual cases, when the image pickup optical system causes the asymmetrical aberration such as the coma aberration, the color bleeding caused by the image pickup optical system with respect to the image of the object occurs in some directions and does not occur in other directions. Therefore, if the color-bleeding occurrence region is determined based only on the monotonic increase/decrease when the object has the same type of color as that of the color bleeding, the color of the object is likely to be determined to be the color bleeding in error. This means that the color-bleeding occurrence region cannot be correctly determined based only on the monotonic increase or the monotonic decrease.

In this embodiment, the region in which the monotonic increase or the monotonic decrease is detected includes either one of a pixel section in a horizontal, vertical or oblique direction whose center is a target pixel of the color image and a pixel section in the horizontal, vertical or oblique direction whose end point is the target pixel of the color image.

The detection of the monotonic increase or the monotonic decrease is performed by, as a first process, calculating an inclination of the pixel value of the color plane. When the input image is constituted by, for example, three color planes, namely, a G plane, a B plane, and an R plane, the B plane is chosen for which the color bleeding is to be removed and the G plane is used as a reference plane. A brightness inclination Blea with respect to the B plane and a brightness inclination Glea with respect to the G plane are calculated as represented by the following Expression (1).

$$Blea = \left(\frac{dB}{dx}, \frac{dB}{dy}\right) = \left(\frac{B(x+1, y) - B(x-1, y)}{2}, \frac{B(x, y+1) - B(x, y-1)}{2}\right)$$

$$Glea = \left(\frac{dG}{dx}, \frac{dG}{dy}\right) =$$
$$\left(\frac{G(x+1, y) - G(x-1, y)}{2}, \frac{G(x, y+1) - G(x, y-1)}{2}\right)$$

(1)

In Expression (1), G(x+1,y) and B(x+1,y) represent the pixel value of a pixel adjacent to the target pixel in a right direction in the G plane and that of a pixel adjacent to the target pixel in a right direction in the B plane, respectively. G(x−1, y) and B(x−1, y) represent the pixel value of a pixel adjacent to the target pixel in a left direction in the G plane and that of a pixel adjacent to the target pixel in a left direction in the B plane, respectively. G(x,y+1) and B(x,y+1) represent the pixel value of a pixel adjacent to the target pixel in an upper direction in the G plane and that of a pixel adjacent to the target pixel in an upper right direction in the B plane, respectively. G(x,y−1) and B(x,y−1) represent the pixel value of a pixel adjacent to the target pixel in a lower direction in the G plane and that of a pixel adjacent to the target pixel in a lower direction in the B plane, respectively. While a description will be given in this embodiment by using the three color planes, it is possible to perform processing by using an arbitrary number of color planes depending on the number of color planes constituting the image.

Next, referring to FIGS. 2 to 4, a description will be given of a method of determining the color-bleeding occurrence region in the monotonic increase/decrease detection process. FIG. 2 is a flowchart illustrating monotonic increase/decrease determination processing (the monotonic increase/decrease detection process: step S2 of FIG. 1B or step S103 of FIG. 31B) in this embodiment. Each step of FIG. 2 is performed mainly by the image processing apparatus 100 (the detection unit 102). First, at step S1520, the image processing apparatus 100 determines whether or not an ISO sensitivity is high (whether or not the ISO sensitivity is higher than a predetermined sensitivity). The flow proceeds to step S1521 when the ISO sensitivity is high. On the other hand, the flow proceeds to step S1522 when the ISO sensitivity is not high.

At step S1522, the image processing apparatus 100 analyzes a variation in the pixel value of the input image with respect to vertical, horizontal, and oblique pixel sections (predetermined sections) observed when the target pixel of the input image is center. Thereafter, at step S1523, the image processing apparatus 100 determines (detects) whether or not the variation in the pixel value of an input signal in the above-mentioned pixel sections has a monotonic increase/decrease characteristic. When the variation in the pixel value of the input signal in the above-mentioned pixel sections is determined not to have the monotonic increase/decrease characteristic, the image processing apparatus 100 analyzes, at step S1524, the variation in the pixel value of the input signal with respect to vertical, horizontal, and oblique pixel sections observed when the target pixel is an endpoint. Thereafter, at step S1525, the image processing apparatus 100 determines whether or not the variation in the pixel value of the input signal in the above-mentioned pixel sections has the monotonic increase/decrease characteristic.

Figure 3:
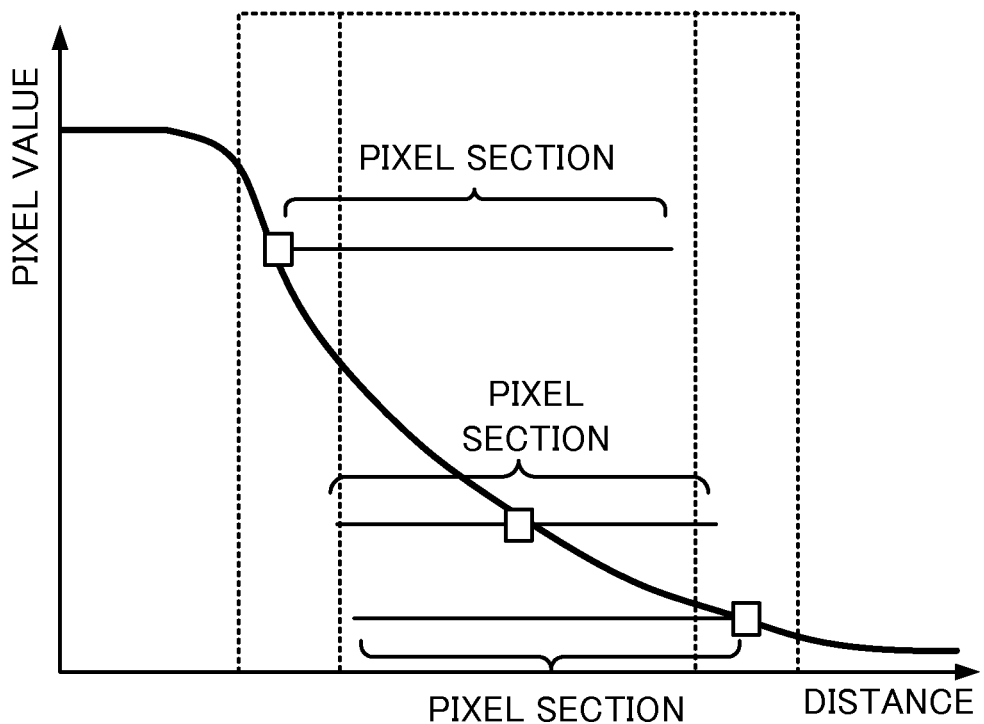
FIG. 3 is a diagram illustrating an example of a case where a pixel section to be subjected to the monotonic increase/decrease determination has a monotonic increase/decrease characteristic in this embodiment.
Figure 4:
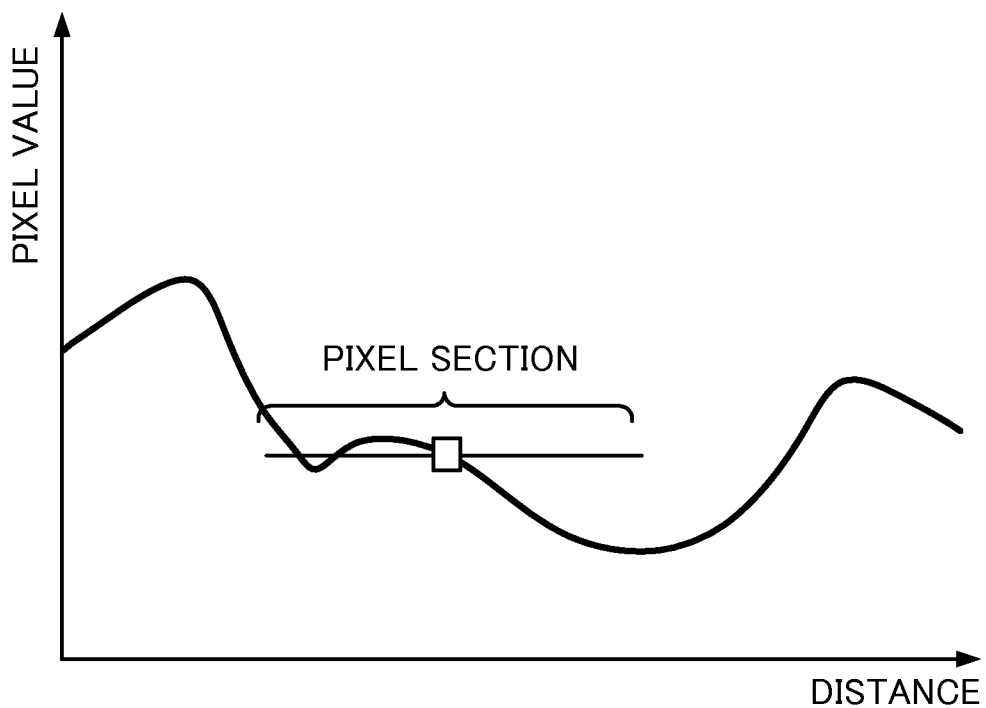
FIG. 4 is a diagram illustrating an example of a case where the pixel section to be subjected to the monotonic increase/decrease determination does not have the monotonic increase/decrease characteristic in this embodiment.

FIG. 3 is a diagram illustrating, as an example, a case where the pixel section to be subjected to the monotonic increase/decrease determination has the monotonic increase/decrease characteristic, and a vertical axis and a horizontal axis indicate the pixel value and a distance, respectively. FIG. 4 is a diagram illustrating, as an example, a case where the pixel section to be subjected to the monotonic increase/decrease determination does not have the monotonic increase/decrease characteristic, and a vertical axis and a horizontal axis indicate the pixel value and the distance, respectively. The image processing apparatus 100 performs the monotonic increase/decrease determination with respect to the input signal having the variation in the pixel value illustrated in FIGS. 3 and 4. Each white square illustrated in FIGS. 3 and 4 is the target pixel.

As illustrated in FIG. 3, an image in which the variation in the pixel value of the input signal has the monotonic increase/decrease characteristic has the monotonic increase/decrease characteristic in the pixel section for which the monotonic increase/decrease determination is to be performed. Therefore, as a result of the analysis made at step S1522 or S1524, the image processing apparatus 100 determines, at step S1523 or S1525, that the image has the monotonic increase/decrease characteristic in the pixel section. On the other hand, the image processing apparatus 100 determines that the image in which the variation in the pixel value of the input signal has a characteristic illustrated in FIG. 4 does not have the monotonic increase/decrease characteristic.

When the variation in the pixel value of the input signal in the above-mentioned pixel section has the monotonic increase/decrease characteristic (a monotonic increase characteristic or a monotonic decrease characteristic), the image processing apparatus 100 sets, at step S1527, a monotonic increase/decrease flag. On the other hand, when the variation in the pixel value of the input signal in the above-mentioned pixel section does not have the monotonic increase/decrease characteristic (the monotonic increase characteristic or the monotonic decrease characteristic), the image processing apparatus 100 does not set, at step S1526, the monotonic increase/decrease flag.

The above-mentioned monotonic increase/decrease determination is applied to each pixel in the B plane. Symbol "1" is allocated to the B plane when the monotonic increase/decrease flag is set on each pixel as a result of the determination and symbol "0" is allocated to the B plane when the monotonic increase/decrease flag is not set on each pixel, and then the B plane is generated and maintained as a monotonic increase/decrease determination result plane and used in color bleeding determination (step S3 of FIG. 1)

described later. The details of a method of utilizing the monotonic increase/decrease determination result plane will be described later.

Figure 5A:
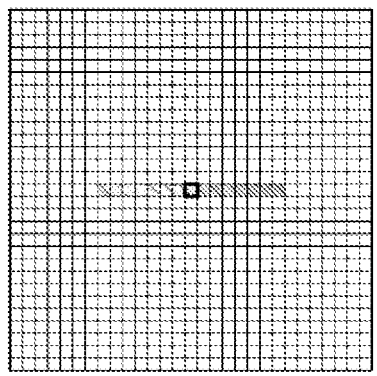
FIGS. 5A, 5B, 5C, and 5D are diagrams illustrating a pixel section for the monotonic increase/decrease determination whose center is a target pixel in this embodiment.
Figure 5B:
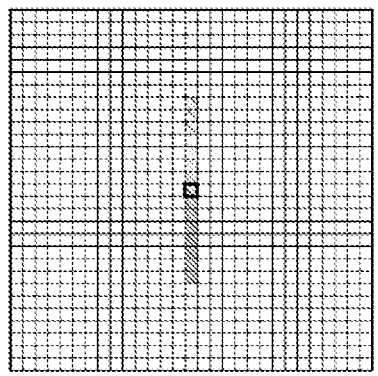

Next, referring to FIGS. 5A to 5D and 6A to 6H, a description will be given of a method of setting the pixel section for which the monotonic increase/decrease determination with respect to the target pixel is performed. FIGS. 5A to 5D are diagrams illustrating the pixel section to be subjected to the monotonic increase/decrease determination whose center is the target pixel. FIGS. 6A to 6H are diagrams illustrating the pixel section to be subjected to the monotonic increase/decrease determination whose endpoint is the target pixel. Of methods of setting the pixel section whose center is the target pixel and methods of setting the pixel section whose endpoint is the target pixel, one possible method of setting the pixel section whose center is the target pixel is to set the pixel section whose center is the target pixel in horizontal and vertical direction as illustrated in FIGS. 5A and 5B.

Figure 5C:
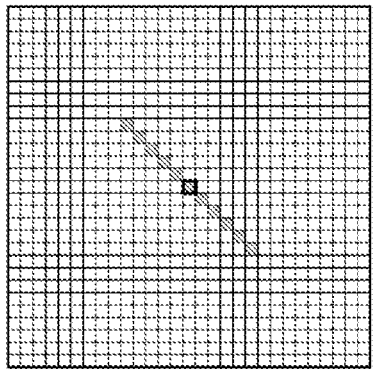
Figure 5D:
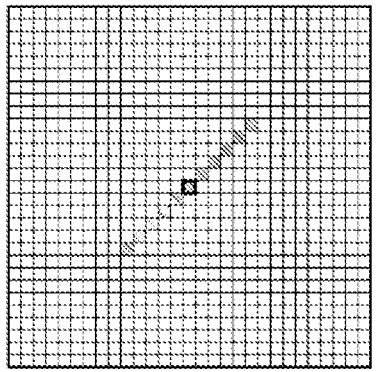
Figure 6A:
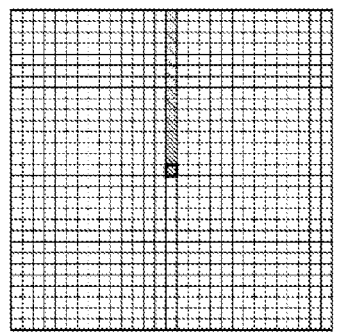
FIGS. 6A, 6B, 6C, 6D, 6E, 6F, 6G, and 6H are diagrams illustrating a pixel section for the monotonic increase/decrease determination whose end point is a target pixel in this embodiment.
Figure 6B:
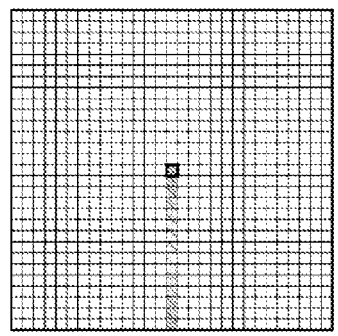
Figure 6C:
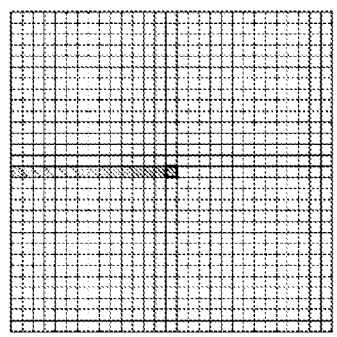
Figure 6D:
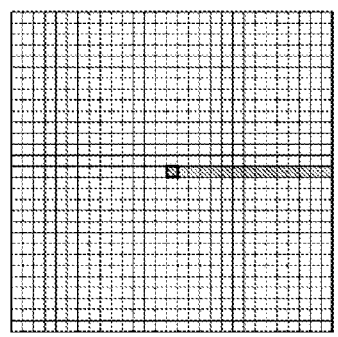
Figure 6E:
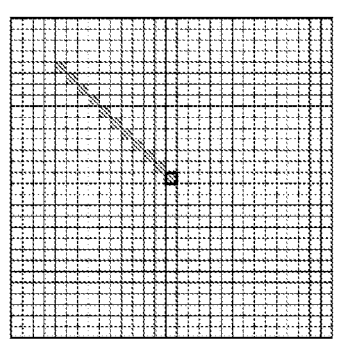
Figure 6F:
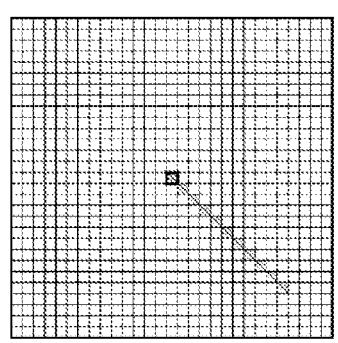
Figure 6G:
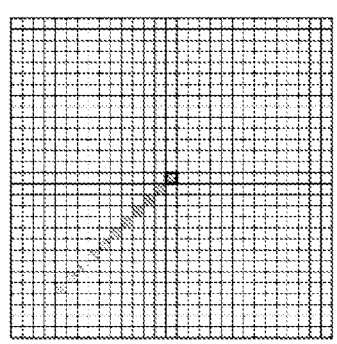
Figure 6H:
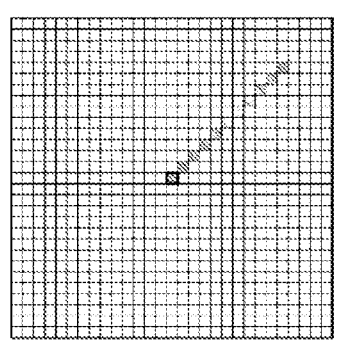

In addition, another possible method of setting the pixel section whose center is the target pixel is to set the pixel section whose center is the target pixel in an oblique direction as illustrated in FIGS. 5C and 5D. That is, setting the pixel section with a distance in the oblique direction which is the same level as that in the horizontal or vertical direction enables the pixel section to be isotropic. In this case, an angle set in the oblique direction is limited to 45 degrees with respect to the horizontal or vertical direction as illustrated in FIGS. 5C and 5D. This embodiment is, however, not limited to this and an arbitrary angle other than 45 degrees can be set. A distance d of the pixel section is calculated using the following Expression (2).

$$d = x/\cos\theta \qquad (2)$$

In Expression (2), symbol x denotes a position in the horizontal direction and symbol θ denotes an angle with respect to the horizontal direction.

On the other hand, the color bleeding at the periphery of the highlighted portion or the shadow portion in the image is impossible to correctly determine in some cases in spite of its presence because it is influenced by saturation or noise. In these cases, a method is effective of setting the pixel section whose end point is the target pixel as illustrated in FIGS. 6A to 6H. When a result of the monotonic increase/decrease determination performed by any of the above-mentioned methods shows that even any one of the pixel sections illustrated in FIGS. 5A to 5D and 6A to 6H is the pixel section having the monotonic increase/decrease characteristic, the target pixel in such a pixel section is determined to be a pixel having the monotonic increase/decrease characteristic.

While, in this embodiment, the pixel value of the input signal is used as a subject of the monotonic increase/decrease determination, the brightness inclination may alternatively be used. In this case, a certain pixel section having a characteristic that a variation in the brightness inclination therein reverses only once is determined to be the color bleeding. It is effective to set, as an appropriate value, the number of pixels in the pixel section such that the number corresponds to a width of the minimum color bleeding of color bleedings which occur in a shooting condition of the image pickup apparatus.

The width of the color bleeding is different depending on a shooting condition (aperture value, focal length, focusing accuracy, focus position in image, coordinates on the image pickup element, and the like). Therefore, setting the number of pixels, as the appropriate value, in the pixel section such that the number corresponds to the color bleeding with the minimum width of various color bleedings which occur in various types of shooting conditions enables detecting the color bleeding with the minimum width. The color bleeding with the maximum width can be detected also by using the pixel section whose number of pixels is adjusted to the color bleeding with the minimum width.

Performing the monotonic increase/decrease determination as described above enables extracting the color bleeding which is desired to be detected. However, it is conceivable that an S/N ratio decreases due to a noise contained in the input signal in some shooting conditions such as high ISO sensitivity, resulting in a situation that the color bleeding does not have the monotonic increase/decrease characteristic. In this case, it is effective to perform filtering processing with a digital filter for the input signal at step S1521 of FIG. 2. While a case where a low-pass filter is used as the digital filter will be described in this embodiment, applicable filters are not limited to this.

Figures 7, 8, 9:
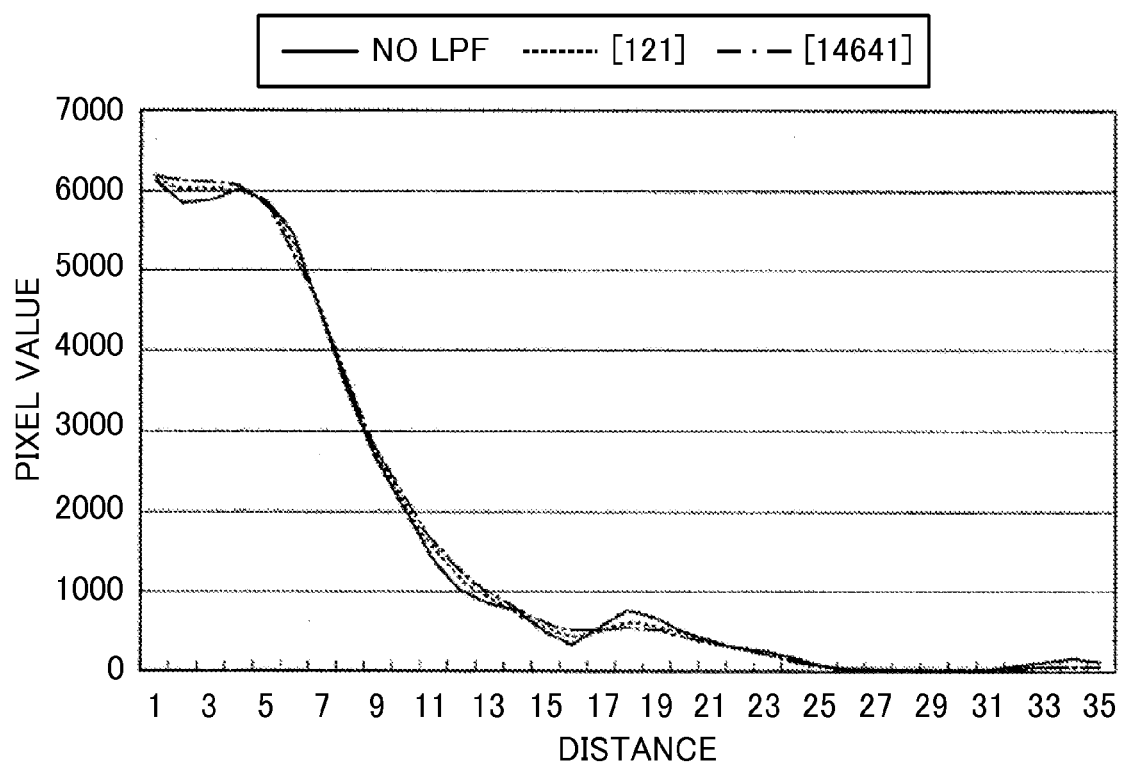
FIG. 7 is a diagram illustrating a 3×3 pixel region in an image in this embodiment.
FIG. 8 is a diagram illustrating a result of applying a low-pass filter to each pixel of the 3×3 pixel region in this embodiment.
FIG. 9 is a diagram illustrating an example of a variation in an input signal observed when the low-pass filter is applied to each pixel in this embodiment.

As methods of applying the low-pass filter to the input signal, several methods are possible. A description will be given of a case as an example where a [1 2 1] low-pass filter is applied whose weight coefficient is twice as large as that of adjacent pixels. FIG. 7 is a diagram illustrating a 3×3 pixel region in the image. As illustrated in FIG. 7, where symbol p represents the target pixel in a region on the 3×3 pixels in the image, the [1 2 1] low-pass filter is applied in the horizontal direction. In this situation, the target pixel is represented by the following Expression (3).

$$P = (d\cdot1 + p\cdot2 + e\cdot1)/4 \qquad (3)$$

A result of calculating the adjacent pixels as well in a similar manner is as illustrated in FIG. 8. FIG. 8 is a diagram illustrating a result of the application of the low-pass filter to each pixel in the 3×3 pixels in the image. Subsequently, when the [1 2 1] low-pass filter is applied in the vertical direction, the target pixel is represented by the following Expression (4).

$$PP = (B\cdot1 + P\cdot2 + G\cdot1)/4 \qquad (4)$$

Referring to FIG. 9, a description will be given of an example of a variation in the input single observed when the low-pass filter is applied. FIG. 9 is a diagram illustrating the example of the variation in the input signal observed when the low-pass filter is applied to each pixel. In FIG. 9, a horizontal axis and a vertical axis indicate a distance (the pixel section extending from the target pixel, namely, a cross-section in the image) and a pixel value of the plane, respectively.

A solid line, a thin dashed line, and a rough dotted line in FIG. 9 indicates a value observed when the low-pass filter is not applied, a value observed when the [1 2 1] low-pass filter is applied, and a value observed when a [1 4 6 4 1] low-pass filter is applied, respectively. [1 4 6 4 1] means that the low-pass filter is applied with a pixel adjacent to, across one pixel, the pixel adjacent to the target pixel being also multiplied by the weight coefficient. Applying the low-pass filter in this manner to smooth the input signal enables causing an original monotonic increase/decrease characteristic of the color bleeding to distinctively appear. While the low-pass filter is applied in order of the horizontal direction and then the vertical direction, applicable orders are not limited to this. The low-pass filter may be applied in an inverse order, namely, in order of the vertical direction and then the horizontal direction. It is also permissible to calculate a two-dimensional low pass filter coefficient and to then apply the low-pass filter in horizontal and vertical directions simultaneously.

Referring back to FIG. 1B, at step S3, the image processing apparatus 100 (the determination unit 103) determines whether or not the region temporarily determined by the detection unit 102 to be the color-bleeding occurrence region (the first region) at step S2 is a color-bleeding occurrence region (a second region). That is, the determination unit 103 determines the region in which the color bleeding occurs, based on optical information concerning the color bleeding of the image pickup optical system and on information concerning the first region. The optical information is, for example, information on a second direction in which the color bleeding of the image pickup optical system occurs (optical information in a color-bleeding occurrence direction). In this embodiment, the color-bleeding occurrence region is determined by using the optical information in the color-bleeding occurrence direction of the image pickup optical system shooting the input image.

As described above, the determination unit 103 compares the first direction (a direction in which the signal level monotonically increases or monotonically decreases) with the second direction (the direction in which the color bleeding of the image pickup optical system occurs) to determine the second region. The determination unit 103 determines that the first region (the region detected at step S2) is the second region (the region in which the color bleeding occurs) when, for example, the first direction and the second direction match with each other.

A negative effect brought about when the color-bleeding occurrence region is determined based only on the monotonic increase/decrease detection process will now be described with reference to FIGS. 10A to 10C and 11A to 11C. An image acquired by the image pickup apparatus such as a digital camera by capturing an object contains a blur component, as an image deterioration component, caused by the spherical aberration, the coma aberration, a field curvature, and astigmatism of the image pickup optical system, and the like. This blur component occurs if a light beam from a point of the object which should again converge into another point on an imaging plane forms an image, being spread to a certain extent when there is no aberration and no influence of diffraction.

From an optical point of view, the blur component is represented by a point spread function (PSF) and is different from a blur caused by the defocus. In addition, the color bleeding in the color image caused by the axial chromatic aberration of the optical system, the coma aberration of the color, or the coma aberration of the color can be referred to as a difference in blur manner which occurs depending on a wavelength of light. Furthermore, the color bleeding in the horizontal direction caused by a chromatic aberration of magnification can be referred to as a position displacement (position shift) or a phase displacement (phase shift) due to a difference in imaging magnification which occurs depending on the wavelength of the light.

An optical transfer function (OTF) acquired by performing the Fourier transform for the point spread function is frequency component information of each aberration and is represented by a complex number. An absolute value of the optical transfer function (OTF), namely, an amplitude component is referred to as a "modulation transfer function" (an MTF), and a phase component is referred to as a "phase transfer function (a PTF), respectively. The MTF and the PTF are a frequency characteristic of the amplitude component of image deterioration due to each aberration and that of the phase component of such image deterioration, respectively. The PTF is represented by the following Expression (5), with the phase component being a phase angle.

$$PTF = \tan^{-1}(Im(OTF)/Re(OTF)) \quad (5)$$

In Expression (5), Re(OTF) and Im(OTF) are a real part and an imaginary part of the OTF, respectively.

As described above, since the optical transfer function (OTF) of the optical system deteriorates the amplitude component and the phase component of the image, the deteriorated image is in a state in which each point of the object is asymmetrically blurred as can be seen in the coma aberration.

Figure 10A:
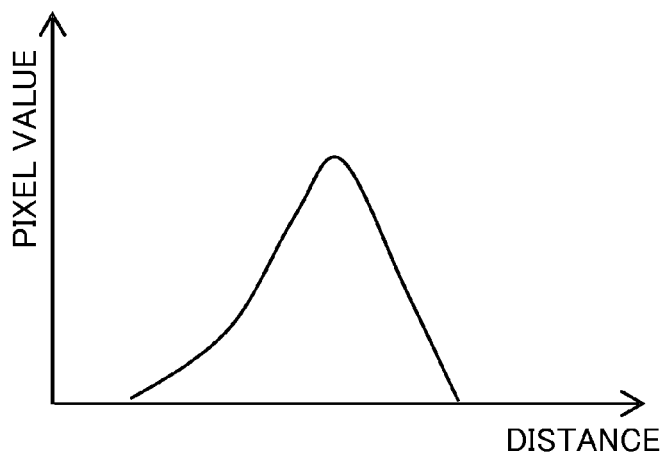
FIGS. 10A, 10B, and 10C are diagrams illustrating an example of monotonic increase/decrease detection of an image pickup optical system which causes a symmetrical aberration in this embodiment.
Figure 10B:
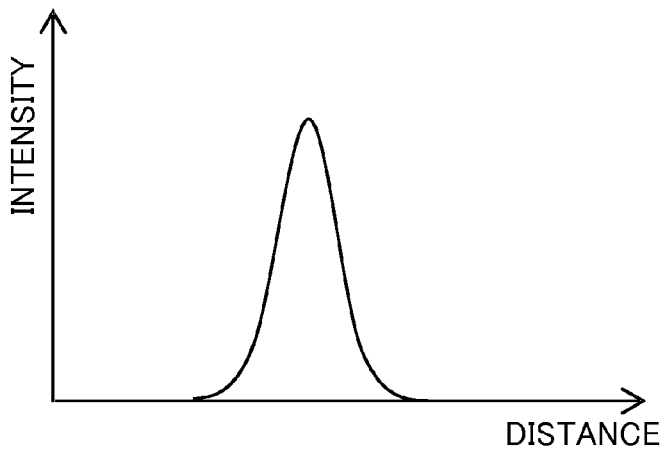
Figure 10C:
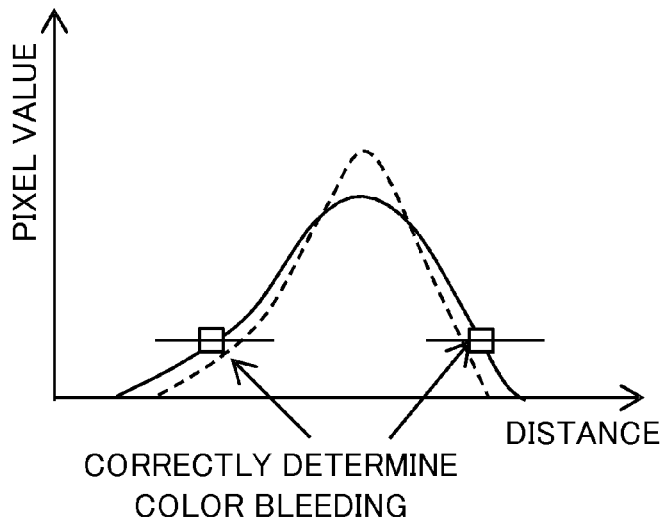

FIGS. 10A to 10C are diagrams explaining a case where the monotonic increase/decrease detection is performed for the image shot in a state in which an optical characteristic appears that each point of the object symmetrically blurs as can be seen in the spherical aberration. FIGS. 10A, 10B, and 10C illustrate a pixel value section of the object, a PSF section of the image pickup optical system, and a pixel value section of the object shot with the image pickup optical system, respectively. As illustrated in FIG. 10B, when the image pickup optical system has a symmetrical aberration characteristic and the PSF is symmetrical accordingly, an edge section at both sides of the object is shot as an image, both sides of which are deteriorated as indicated by a solid line in FIG. 10C. In FIG. 10C, the brightness section of the object illustrated in FIG. 10A is indicated by a dotted line for comparison. When the monotonic increase/decrease determination is performed with each white square in FIG. 10C being deemed as the target pixel, both of the edges are determined to be the monotonic increase/decrease regions. Moreover, since the color bleeding actually occurs, both of the edges are correctly determined in the determination of the color-bleeding occurrence region.

Figure 11A:
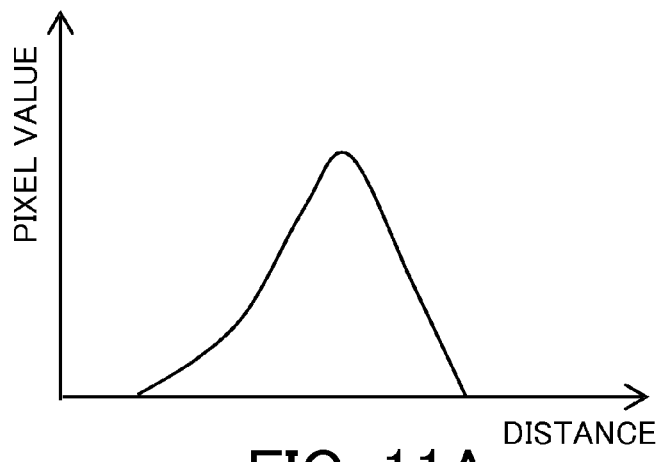
FIGS. 11A, 11B, and 11C are diagrams illustrating an example of the monotonic increase/decrease detection of an image pickup optical system which causes an asymmetrical aberration in this embodiment.
Figure 11B:
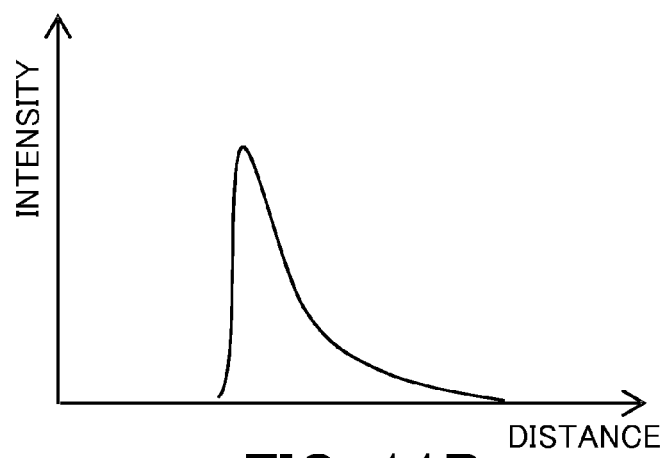
Figure 11C:
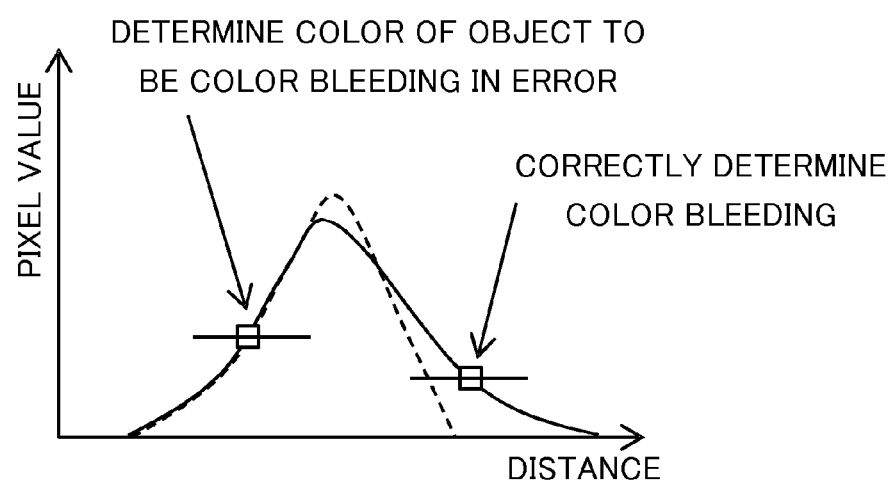

FIGS. 11A to 11C are diagrams explaining a case where the monotonic increase/decrease detection is performed for the image shot in a state in which an optical characteristic appears that each point of the object asymmetrically blurs as can be seen in the coma aberration. FIGS. 11A, 11B, and 11C illustrate the pixel value section of the object, the PSF section of the image pickup optical system, and the pixel value section of the object shot with the image pickup optical system, respectively. As illustrated in FIG. 11B, when the image pickup optical system has an asymmetrical aberration characteristic and the PSF is asymmetrical accordingly, the edge sections of the object are shot as an image, one side of which is greatly deteriorated as indicated by a solid line in FIG. 11C. While both of the edges are determined to be the monotonic increase/decrease regions when the monotonic increase/decrease detection is performed for this shot image, a negative effect occurs that the original color of the object is determined to be the color bleeding because the color bleeding is actually caused by the image pickup optical system only at one side. Performing color bleeding correction based only on the monotonic increase/decrease detection results in the reduction of the original color of the object, which may make the image unnatural. An attempt to avoid this, however, results in insufficient correction.

For these reasons, in this embodiment, the image processing apparatus 100 maintains or acquires the optical information on the color-bleeding occurrence direction of the image pickup optical system illustrated in FIGS. 10B and 11B. Thereafter, when a monotonic increase/decrease direction in the monotonic increase/decrease detection corresponds to the color-bleeding occurrence direction, the image processing apparatus 100 determines the region as the color-bleeding occurrence region. The expression "correspond to" as used herein includes not only a strict match, but also a substantial match.

Referring to FIGS. 12A and 12B, the optical information will be described. FIGS. 12A and 12B are explanatory diagrams of the optical information in this embodiment and illustrate the PSF section and the optical information of the image pickup optical system. FIG. 12A illustrates the optical information acquired when the PSF of the image pickup optical system illustrated in FIG. 10B is symmetrical. FIG. 12B illustrates the optical information acquired when the PSF of the image pickup optical system illustrated in FIG. 11B is asymmetrical. For instance, the optical information has a value of "1" in the direction in which the color bleeding occurs due to the aberration caused by the image pickup optical system and has a value of "0" in the direction in which the color bleeding does not occur. In FIG. 12A, the optical information has a value of "1" at both sides because the color bleeding occurs symmetrically at both sides. In FIG. 12B in which the color bleeding occurs asymmetrically, the optical information has a value of "0" at the left edge because the color bleeding does not occur at the left edge and has a value of "1" because the color bleeding occurs at the right edge.

FIGS. 13A and 13B are diagrams illustrating an example of determining the color bleeding region based on the optical information and the result of the monotonic increase/decrease detection. As illustrated in FIG. 13A, when, for example, the monotonic decrease is detected by the monotonic increase/decrease detection, the optical information in the monotonic decrease direction is referred to determine the region as a color bleeding correction region if the optical information has a value of "1". Similarly, as illustrated in FIG. 13B, the optical information in the monotonic decrease direction is referred to determine the color as the color of the object if the optical information has a value of "0". As described above, having both of the information in the direction in which the chromatic aberration as the aberration caused by the image pickup optical system occurs and the information in the direction in which the chromatic aberration does not occur enables correctly determining the color of the object and the color bleeding, which makes it possible to enhance an accuracy of the color bleeding correction. While the direction in which the color bleeding occurs is set to "1" and the direction in which the color bleeding does not occur is set to "0", it is enough if the direction in which the color bleeding occurs can be known and thus the value is not necessarily required to be "0" or "1". Since the aberration caused by the image pickup optical system varies depending on an image height, having the optical information at a plurality of image heights enables performing the correction with high accuracy. A correction value for an image height which is not contained in the optical information may be generated by interpolation based on nearby correction values which are contained in the optical information. In addition, since the aberration caused by the image pickup optical system varies depending also on the shooting condition (a focal length of the image pickup optical system, an object distance, and an aperture value (Fno)), storing or acquiring the optical information for each shooting condition enables performing the correction with high accuracy.

Figure 14A:
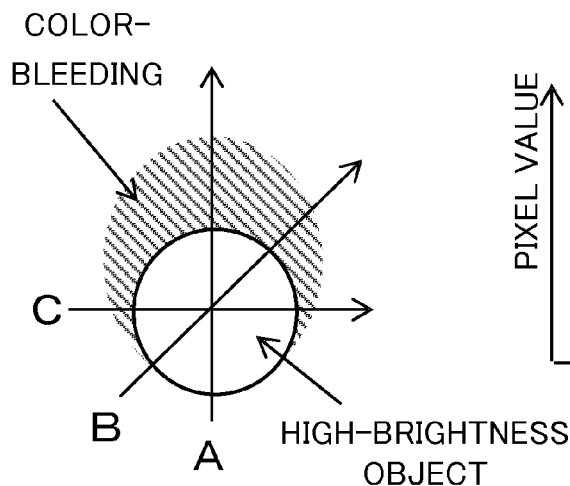
FIGS. 14A, 14B, 14C, and 14D are explanatory diagrams of two-dimensional optical information in this embodiment.
Figure 14B:
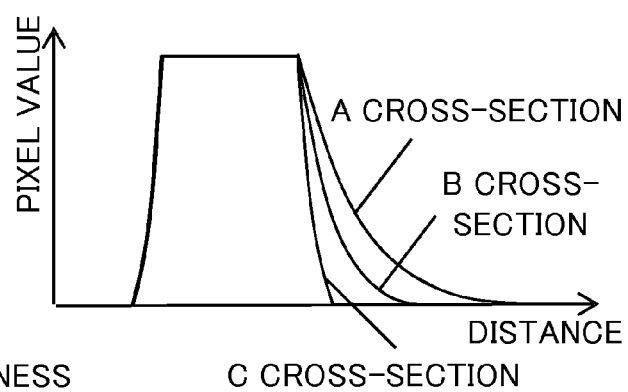
Figure 14C:
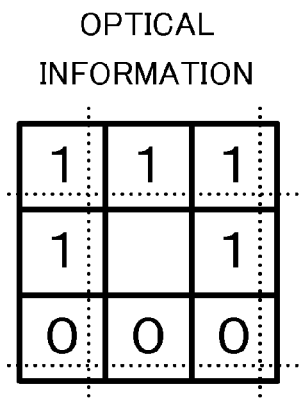

While the optical information has been described as one-dimensional information in FIGS. 10A to 10C and 11A to 11C, the optical information may be also stored as two-dimensional data when the shot image is two-dimensional-array data. FIGS. 14A to 14D are explanatory diagrams for a case where the optical information is two-dimensional. FIG. 14C illustrates an example of storing the optical information as data of eight directions consisting of upper, lower, left and right directions, and directions of angles of 45 degrees and 135 degrees on a screen. In FIGS. 14A to 14D, the coma aberration caused by the image pickup optical system occurs in the upper direction on the screen and the optical information "1" is stored in such a direction. The optical information "0" is stored in the direction in which the color bleeding does not occur. After performing the monotonic increase/decrease detection in the above-mentioned eight directions, the determination is made that the color bleeding occurs if the optical information "1" is stored in the direction in which the monotonic decrease is detected. The determination is made that it is the color of the object even when the monotonic decrease is detected if the optical information "1" is not stored in the direction in which the monotonic decrease is detected.

As described above, the image processing apparatus 100 stores or acquires the optical information on the direction in which the color bleeding caused by the image pickup optical system occurs. Preferably, the image processing apparatus 100 includes the storage unit 106 which stores the optical information. More preferably, the storage unit 106 stores the optical information for each shooting condition. Each shooting condition includes at least one of the focal length of the image pickup optical system, the object distance, and the aperture value. The storage unit 106 may be provided outside the image processing apparatus 100.

The image processing apparatus 100 is capable of determining the color bleeding region with high accuracy by referring to the detection direction and the optical information at the time of the monotonic increase/decrease detection. While the monotonic increase/decrease determination has been described in a monotonic decrease direction, the color bleeding determination may be performed by using a monotonic increase direction. In addition, while the monotonic increase/decrease determination and the correction value of the optical information are described in the eight directions, applicable directions are not limited to the eight directions. Moreover, the number of detection directions may be increased to enhance the accuracy. Alternatively, the number of detection directions may be decreased to reduce an amount of data on the optical information.

In addition, the image processing apparatus 100 may be configured to store or acquire, as the optical information, information on an intensity of the color bleeding (color bleeding intensity information) in addition to the color-bleeding occurrence direction. This enables performing the correction with higher accuracy. As illustrated in FIG. 14B, an occurrence amount of the color bleeding due to the aberration caused by the image pickup optical system is different depending on the direction. Therefore, as illustrated in FIG. 14D, the color bleeding intensity information on the color bleeding occurrence amount may be added in the direction in which the color bleeding occurs.

Figures 15A, 15B, 15C:
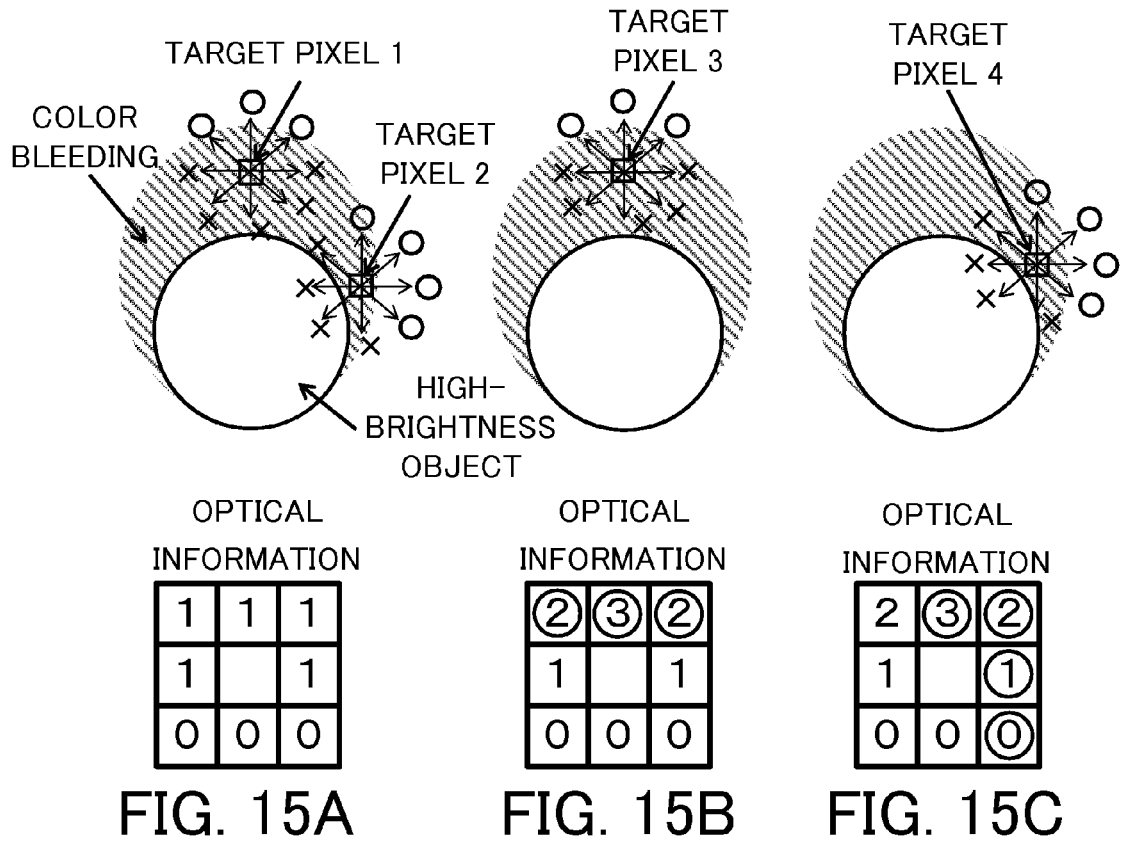
FIGS. 15A, 15B, and 15C are diagrams illustrating color bleeding determination processing using the optical information in this embodiment.

Subsequently, referring to FIGS. 15A to 15C, the color bleeding determination using the intensity information will be described. FIGS. 15A to 15C are diagrams illustrating color bleeding determination processing using the optical information and illustrate an example of a case where the optical information contains only the color-bleeding occurrence direction. When the determination of the color-bleeding occurrence region is to be performed for a target pixel 1 boxed in the drawing, the monotonic decrease determination is first performed for eight directions, namely, upper, lower, left and right directions of the target pixel 1, and directions of angles of 45 degrees and 135 degrees from the target pixel 1. In FIG. 15A, since a high-brightness object is located at a lower side of the target pixels, the monotonic decrease is detected in three areas, namely, the upper, upper right, and upper left directions. Since the optical information in the three directions is "1" which indicates the color-bleeding occurrence direction, the target pixel 1 is determined to be the color-bleeding occurrence region. Similarly, when the detection is performed also for the target pixel 2, the upper, upper right, right, and lower right directions are determined to be the monotonic decrease directions. However, since the optical information in the color-bleeding occurrence direction stores "0" which indicates that the color bleeding does not occur in the lower right direction, final color bleeding detection directions of the target pixel 2 are set to three directions, namely, the upper, upper right, and right directions based on the monotonic decrease and the optical information. While both of the target pixels 1 and 2 are determined to be color-bleeding occurrence pixels, the color bleeding occurrence amounts on the target pixels 1 and 2 are different from each other because the color bleeding occurrence amount of the image pickup optical system is different depending on the direction as illustrated in FIG. 14B. When the optical information does not contain the intensity information, the color bleeding amount cannot be determined, which makes it impossible to perform the correction at a different correction strength in a subsequent color-bleeding correction process. Hence, the target pixel 2 is excessively corrected when the color bleeding correction strength is increased so as to match with that on the target pixel 1 and the target pixel 1 is insufficiently corrected when the color bleeding correction strength is decreased so as to match with that on the target pixel 2.

Figure 14D:
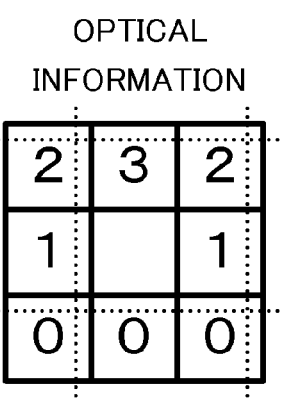

Therefore, as illustrated in FIG. 14D, it is preferable to add, to the optical information, the color-bleeding occurrence direction and the color bleeding intensity information in such a direction. FIGS. 15A and 15B illustrate a method of determining the color bleeding region when the color bleeding intensity information is added to the optical information. Three directions, namely, the upper, upper left, and upper right directions are determined in the monotonic decrease determination on a target pixel 3 in FIG. 15B, and the color bleeding intensities that are the optical information can also be detected as 2 for the upper direction, 3 for the upper left direction, and 2 for the upper right direction, which are high color bleeding intensities. Three directions, namely, the upper, upper right, and lower left directions are determined in the monotonic decrease determination on a target pixel 4 in FIG. 15C, and the color bleeding intensities in these directions that are the optical information are detected as 3 for the upper direction, 2 for the upper right direction, and 1 for the lower left direction, which are lower color bleeding intensities than those on the target pixel 3. Hence, for example, changing the correction severity (a strength of correcting the image) applied to the subsequent color-bleeding correction processing by using an average value of the color bleeding intensities in the detected directions enables performing more accurate correction even when the color-bleeding occurrence amount is different depending on the direction.

The use of the color-bleeding intensity average value on the target pixel 3 of approximately 2.3 and the color-bleeding intensity average value on the target pixel 4 of approximately 2.0 enables changing the correction strength. While a description has been given of the use of the average value of the color bleeding strength, applicable methods are not limited to this. For instance, a color bleeding intensity value in a centroid direction of a plurality of directions detected as the color bleeding directions may be used to change a color-bleeding correction coefficient. The color bleeding intensity on the target pixel 3 is 3 because the centroid direction thereon is the upper direction and the color bleeding intensity on the target pixel 4 is 2 because the centroid direction thereon is the upper right direction. The use of these values enables changing the correction strength. If the centroid direction of four directions, namely, the upper, upper right, right, and lower right directions is calculated when a concept of the centroid direction is adopted, two directions, namely, the upper right and right directions may be directions closest to the centroid direction. It is possible in this case to use, for example, the average value of the color bleeding intensities in the two directions, the value of the larger one of the color bleeding intensities in the two directions, or the value of the smaller one of the color bleeding intensities in the two directions. While a description has been given in this embodiment of using the average value and the centroid, the color bleeding intensity information that is the optical information may be arbitrarily calculated to change the correction strength applied in the color bleeding correction.

As described above, preferably, when the first direction and the second direction match with each other in a plurality of directions, the image processing apparatus 100 (the correction unit 104) arbitrarily calculates the information on the color bleeding intensities in the plurality of directions to correct the image. More preferably, when the first direction and the second direction match with each other in the plurality of directions, the correction unit 104 uses the information on or the average value of the color bleeding intensities in the centroid direction of the plurality of directions to correct the image.

Figures 16A, 16B:
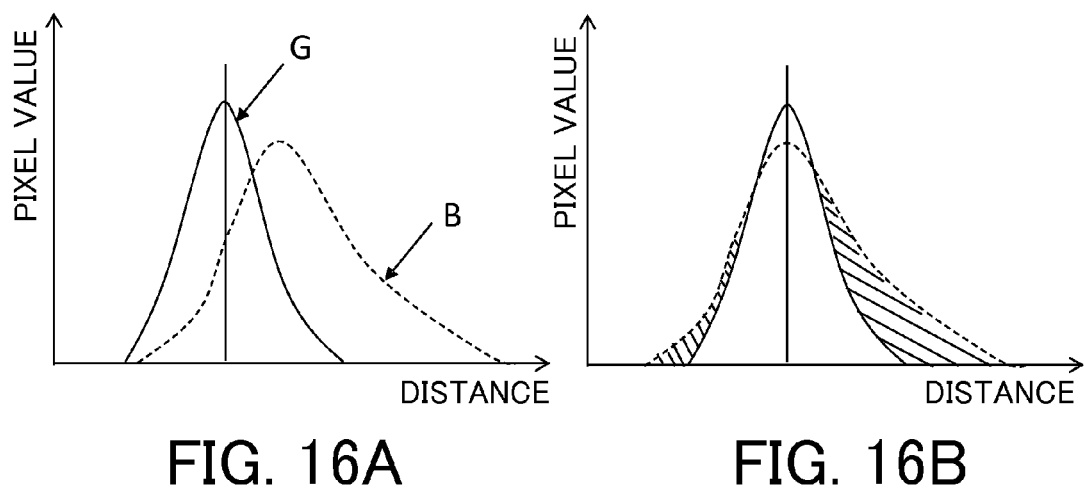
FIGS. 16A and 16B are explanatory diagrams of a method of calculating the optical information in this embodiment.

Subsequently, referring to FIGS. 16A and 16B, a method of calculating the optical information will be described. FIGS. 16A and 16B are explanatory diagrams of the method of calculating the optical information and illustrate the PSF section (solid line) of the G plane of the image pickup optical system and the PSF section (dotted line) of the B plane of the image pickup optical system in an arbitrary direction stored as the optical information. A description will be given of a method of calculating the optical information on the color bleeding of the B plane, with the G plane being a reference plane.

The G plane and B plane have PSF shapes different from each other due to the aberration in each wavelength band resulting from the chromatic aberration caused by the image pickup optical system. In addition, since the image is formed at a displaced position on each of the G plane and the B plane due to the chromatic aberration of magnification, a peak position of each PSF is calculated at the displaced position as illustrated in FIG. 16A. The displacement on each color plane caused by the chromatic aberration of magnification can be corrected by a conventional geometric conversion which adds distortions different from each other to the color planes. Therefore, as illustrated in FIG. 16B, a method can be adopted of applying, as the color bleeding intensity, a difference between a PSF area on the G plane, which is the reference plane, and that on the B plane which is indicated by a diagonally-shaded portion, with the PSF peak position on the G plane and that on the B plane matching with each other.

FIG. 16B shows that a larger color bleeding occurs at a right edge because the area difference at the edge located at the left side of the peak is larger than that at the edge located at the right side of the peak. Since the color bleeding is inconspicuous when the area is small, the side with a small area can be defined as the direction in which the color bleeding does not occur. Moreover, this property makes it possible to determine the color bleeding intensity based on an area ratio. While the direction in which the color bleeding occurs and the color bleeding intensity which are the optical information can be calculated by the above-described method, applicable calculation methods are not limited to the method of using the difference between the PSF areas. For instance, in FIG. 16B, a method can be adopted of using a difference between an inclination of the edge of the G plane and that of the edge of the B plane. Since the inclination of the edge tends to be gentle when the color bleeding occurs, the optical information may be determined by using the inclination difference or the like.

While, in this embodiment, a description has been given of the method of calculating the color bleeding intensity with the peak values matching with each other, the color bleeding intensity may be calculated with not the peak values, but the PSF centroids matching with each other. As described above, according to this embodiment, it is possible to calculate the color-bleeding occurrence direction that is the optical information, and the color bleeding intensity information.

Referring back to FIG. 1B, at step S4, the image processing apparatus 100 (the correction unit 104) performs processing of correcting the color bleeding (the color bleeding correction process) for the region (the second region) determined by the determination unit 103 at step S3 to be the color bleeding region. That is, the correction unit 104 corrects the image so as to reduce the color bleeding.

Figure 17:
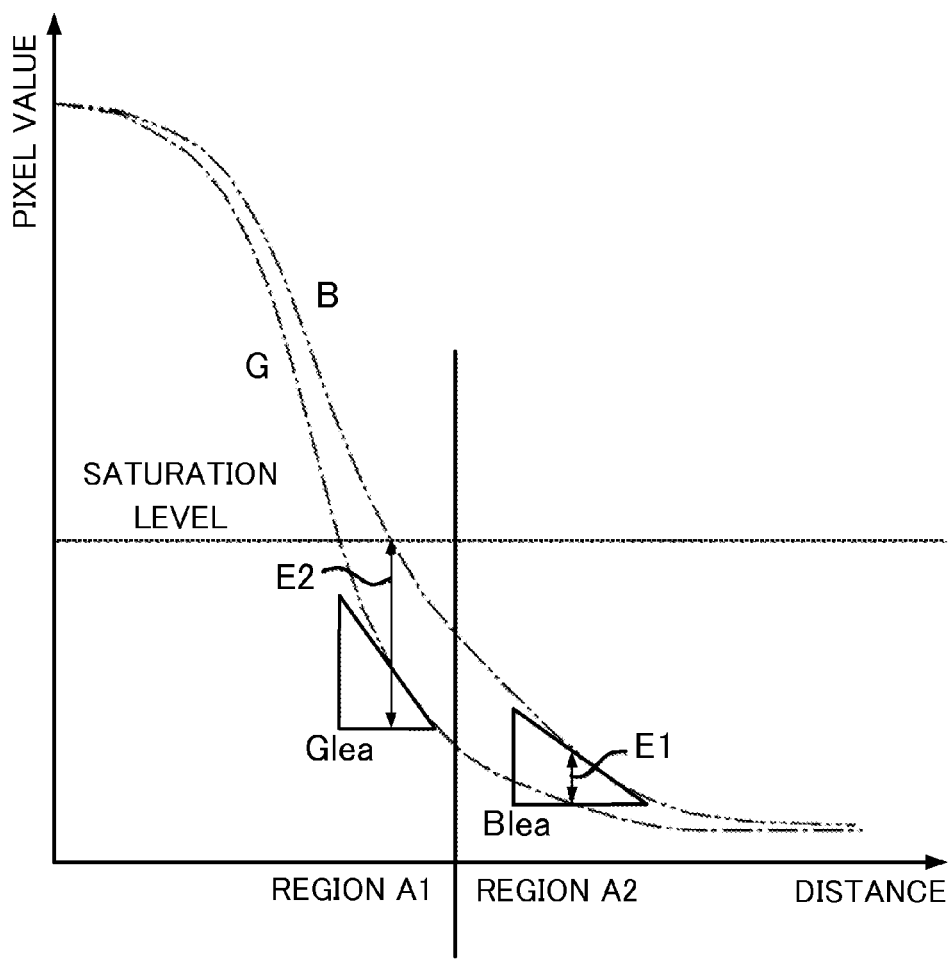
FIG. 17 is a diagram illustrating a typical variation of a pixel value of blue color bleeding in this embodiment.

FIG. 17 is a diagram illustrating a typical pixel-value variation of a blue color bleeding. In FIG. 17, a horizontal axis indicates a distance (a section in the image) and a vertical axis indicates the pixel value of the B plane and the G plane. In FIG. 17, it is assumed that a high-brightness object with a brightness exceeding a saturation brightness is present at a left end. Because of this assumption, event at a portion surrounding a light source which is not light originally, feet of the pixel value variation exponentially expand due to light spread from the light source by the action of the aberration or a flare.

The G plane, which is the reference plane, is not without the bleeding and has a spread to some extent. The spread is, however, smaller compared with that on the B plane for which the color bleeding is to be reduced. In addition, the image pickup element is not capable of measuring the pixel value higher than a certain saturation degree. The blue color bleeding occurs if the intensity on the B plane for which the color bleeding is to be reduced exceeds that on the G plane, which is the reference plane, in this pixel value variation.

In this embodiment, the image processing apparatus 100 estimates a bleeding amount based on the inclination of the pixel value variation on the B plane for which the color bleeding is to be reduced. Then, an absolute value of the brightness inclination Blea of the B plane is multiplied by a coefficient k1 to determine a first estimated bleeding amount E1 as represented by the following Expression (6).

$$E1 = k1|Blea| \quad (6)$$

In Expression (6), k1 is a positive value. However, a pixel value inclination is 0 in a region A1 in which the B plane is saturated, which means that an unsaturated brightness inclination cannot be acquired.

Therefore, an estimated bleeding amount E2 for the region A1 in which the B plane is saturated is estimated based on the brightness inclination Glea of the pixel value variation on the G plane as represented by the following Expression (7).

$$E2 = k2|Glea| \quad (7)$$

In Expression (7), k2 is a positive value.

Figure 18:
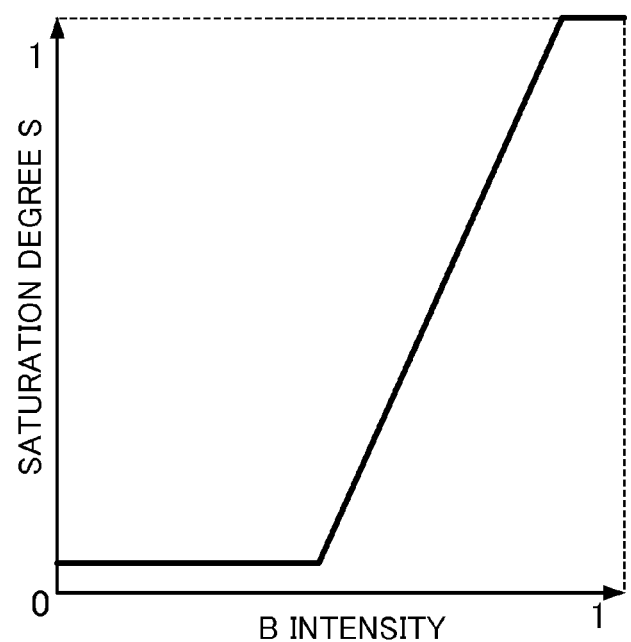
FIG. 18 is a characteristic diagram of non-linear conversion with respect to the pixel value of a B plane in this embodiment.

Next, a non-linear conversion is performed for the pixel value of the B plane to generate a saturation degree S. This non-linear conversion aims to show whether or not the B plane is saturated, and the saturation degree S is 1 in any region in which the intensity on the B plane is saturated and the saturation degree S is 0 in any region in which the intensity on the B plane is small. The saturation degree S may be indicated by two values, namely, 0 and 1, and may alternatively be indicated by values continuously varying in a range from 0 to 1 as illustrated in FIG. 18. FIG. 18 is a characteristic diagram of the non-linear conversion for the pixel value of the B plane.

The estimated bleeding amount E1 or E2 calculated in the above-described manner is selected based on the generated saturation degree S described above. That is, when the saturation degree S is indicated by the two values, namely, 0 and 1, a new estimated bleeding amount E is set as follows.
E=E1 (where S=0)
E=E2 (where S=1)

Similarly, when the saturation degree S is indicated by the values continuously varying in a range from 0 to 1, the new estimated bleeding amount E is set as follows.

$$E = (1-S)E1 + SE2$$

Next, the above-described estimated bleeding amount E is corrected to set an amount E' to be actually reduced. The estimated bleeding amount (a reduction amount) is a value set according to a certain model and thus does not necessarily match with an actual bleeding amount. For instance, while light with a wavelength of 450 nm and light with a wavelength of 400 nm, each as light detected on the B plane, have bleeding characteristics different from each other, this difference is not considered at step S3 (the color bleeding determination process). When the estimated bleeding amount (the reduction amount) is excessively small, a slight degree of blue color remains to be present even after the blue color bleeding is reduced. On the other hand, the estimated bleeding amount (the reduction amount) is excessively large, the B plane excessively decreases with respect to a gray background, which changes the color of the background into greenish-yellow.

In particular, the latter case (the case where the color of the background changes into greenish-yellow) is unnatural and thus gives the user a feeling of strangeness of a great degree. Therefore, at step S4 (the color bleeding correction process), the correction is limited such that the bleeding reduction has its effect only within a certain color phase range. For this reason, first, at step S4, a chromaticity of the pixel is calculated. The following Expression (8) holds for the intensity of each of the R, G, and B planes.

$$\begin{pmatrix} x \\ y \\ z \end{pmatrix} = \begin{pmatrix} 0.41 & 0.36 & 0.18 \\ 0.21 & 0.75 & 0.07 \\ 0.02 & 0.12 & 0.95 \end{pmatrix} \begin{pmatrix} R \\ G \\ B \end{pmatrix} \quad (8)$$

$$a = 5(x-y)$$

$$b = 2(y-z)$$

Figures 19, 20:
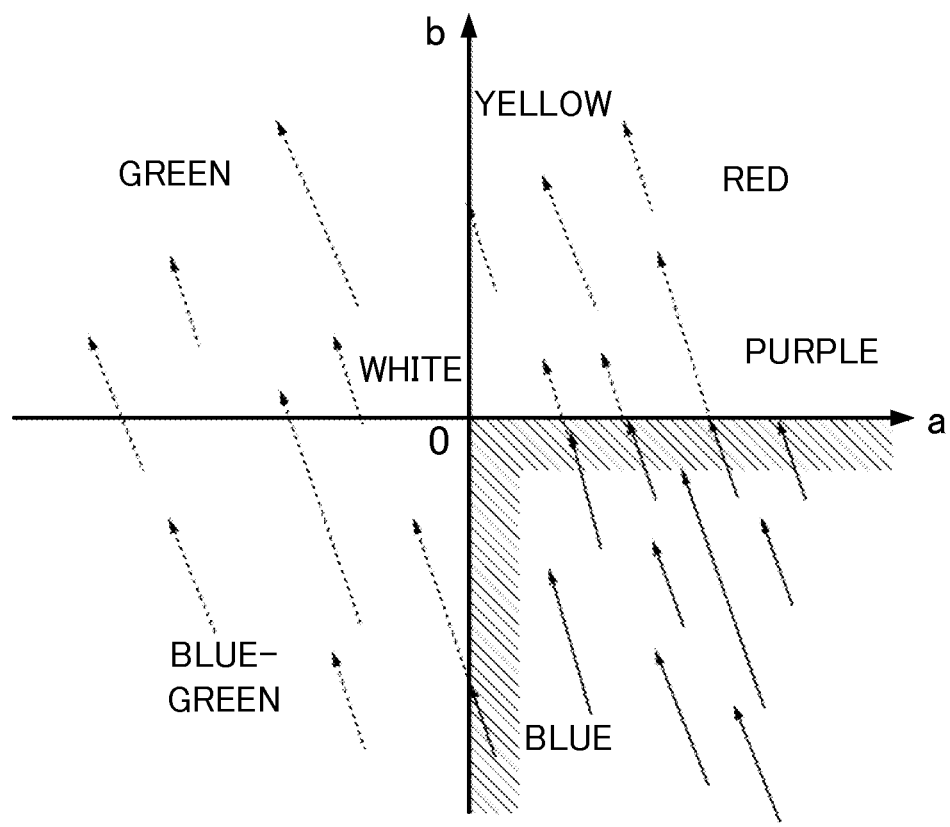
FIG. 19 is a diagram illustrating a chromaticity coordinate a-b surface in this embodiment.
FIG. 20 is a diagram illustrating a 3×3 pixel region in the B plane based on the result of the monotonic increase/decrease detection in this embodiment.

FIG. 19 is a chromaticity coordinate a-b surface in which a horizontal axis indicates "a" of Expression (8) and a vertical axis indicates "b" of Expression (8). As illustrated in FIG. 19, the blue color is present in the fourth quadrant, which is indicated by oblique lines, of the chromaticity coordinate ab surface (Incidentally, red, yellow, and purple are present in the first quadrant, green and white are present in the second quadrant, and blue-green is present in the third quadrant). The reduction of the estimated bleeding amount E from the intensity on the B plane is represented as B=B−E, which means that the blue color moves toward the upper left direction on the chromaticity coordinate a-b surface as indicated by dotted arrows. A starting point of each arrow represents the chromaticity for which the estimated bleeding amount E is not reduced and an ending point of each arrow represents the chromaticity for which the estimated bleeding amount E is eliminated. Because of this, the following Expression (9) holds when an effective color phase range is restricted to a>0 and b<0.

$$B > 0.22R + 0.68G \text{ and } B > -1.84R + 3.30G \qquad (9)$$

Therefore, the reduction amount E', which is an amount to be actually reduced, is set to 0 for any pixel that does not satisfy Expression (9) to exclude such a pixel from pixels for which the color bleeding is to be reduced. This prevents the pixel value of the pixel which does not satisfy Expression (9) from being influenced. In FIG. 19, only the fourth quadrant region indicated by the oblique lines is to be reduced.

Furthermore, the reduction amount E' is set also for any pixel that satisfies Expression (9) such that the reduction amount E' satisfies the following Expression (10).

$$E' = \min(E, B-(0.22R+0.68G), B-(-1.84R+3.30G)) \qquad (10)$$

This makes a chromaticity variation due to the reduction of the reduction amount E' occur only in the fourth quadrant as indicated by solid-line arrows in FIG. 19.

While a range in which the chromaticity variation occurs is restricted to the fourth quadrant of the chromaticity coordinate a-b surface in this embodiment, applicable ranges are not limited to this and such a range may be restricted by an arbitrary angle. In this situation, it is necessary to satisfy the following Expression (11).

$$B > r1 \cdot G + r2 \cdot R \text{ and } B > r3 \cdot G + r4 \cdot R \qquad (11)$$

In Expression (11), r1 to r4 are calculated as represented by the following Expression (12), by using limit angles θ. Color phase restriction is defined by two straight lines passing through an origin point of the chromaticity coordinate a-b surface, and symbols θ1 and θ2 denote angles representing the two straight lines.

$$r1 = \frac{-0.358 \cdot \tan\theta_1 - 0.596}{-0.108 \cdot \tan\theta_1 - 0.878}$$

$$r2 = \frac{0.2 \cdot \tan\theta_1 - 0.193}{-0.108 \cdot \tan\theta_1 - 0.878}$$

$$r3 = \frac{-0.358 \cdot \tan\theta_2 - 0.596}{-0.108 \cdot \tan\theta_2 - 0.878}$$

$$r4 = \frac{0.2 \cdot \tan\theta_2 - 0.193}{-0.108 \cdot \tan\theta_2 - 0.878}$$

$$(12)$$

This enables preventing the B plane from decreasing beyond a color phase restriction range. The reduction amount E' of the color plane for which the color bleeding is to be reduced that is calculated as described above is stored as an reduction amount plane, and then the color bleeding correction processing is performed for the reduction plane. The above-mentioned low-pass filter is applied to the reduction plane. While a simplified a*b* plane is used to restrict the color phase in this embodiment, applicable methods are not limited to this and a 3×3 RGB-to-YUV matrix may alternatively be used to perform the color phase restriction processing on an uv plane.

The above-mentioned reduction amount E' is subtracted from the intensity of the B plane to create a new plane. The color bleeding is to be reduced only for the pixel which is determined to be the color bleeding region at color bleeding determination step S4. Therefore, as to the intensity of the new B plane, the relation of B=B−E' is satisfied when the monotonic increase/decrease determination flag is set to "1" and the relation of B=B is satisfied when the monotonic increase/decrease determination flag is set to "0". As described above, at step S5 of FIG. 1, the image processing apparatus 100 (the output unit 105) outputs, as an output image, the color image whose B plane is corrected.

A description will now be given of a case where the value of the monotonic increase/decrease determination flag set as a result of the monotonic increase/decrease determination for a specific region in the 3×3 pixels in the image illustrated in FIG. 7 is different among adjacent pixels as illustrated in FIG. 20. In this case, the reduction amount varies at a boundary portion between each pixel (in other words, adjacent pixels for which the color bleeding is to be eliminated and those for which the color bleeding is not to be reduced are present together) causing the pixel value variation to be sharp, which makes the image look unnatural and thus may give the user the feeling of strangeness. For this reason, a method is effective of applying the low-pass filter to the generated reduction amount plane.

Moreover, a gain of each pixel of the color plane may be calculated as represented by the following Expression (13) by using the monotonic increase/decrease determination result plane and then multiplied by the reduction amount to perform smoothing processing for the boundary portion (the monotonic increase/decrease determination result plane).

$$\text{Gain} = (a\text{Flag} + b\text{Flag} + c\text{Flag} + d\text{Flag} + p\text{Flag} + e\text{Flag} + f\text{Flag} + g\text{Flag} + h\text{Flag})/9$$

$$E'' = \text{Gain} \times E' \qquad (13)$$

In an example illustrated in FIG. 20, the reduction amount E' of a pixel p is represented by the following Expression (14).

$$0.56 = (0+0+1+0+1+1+0+1+1)/9$$

$$E'' = 0.56 \times E' \qquad (14)$$

The above-described method enables reducing only the color bleeding without giving the user the feeling of strangeness.

[First Embodiment]

Figure 21:
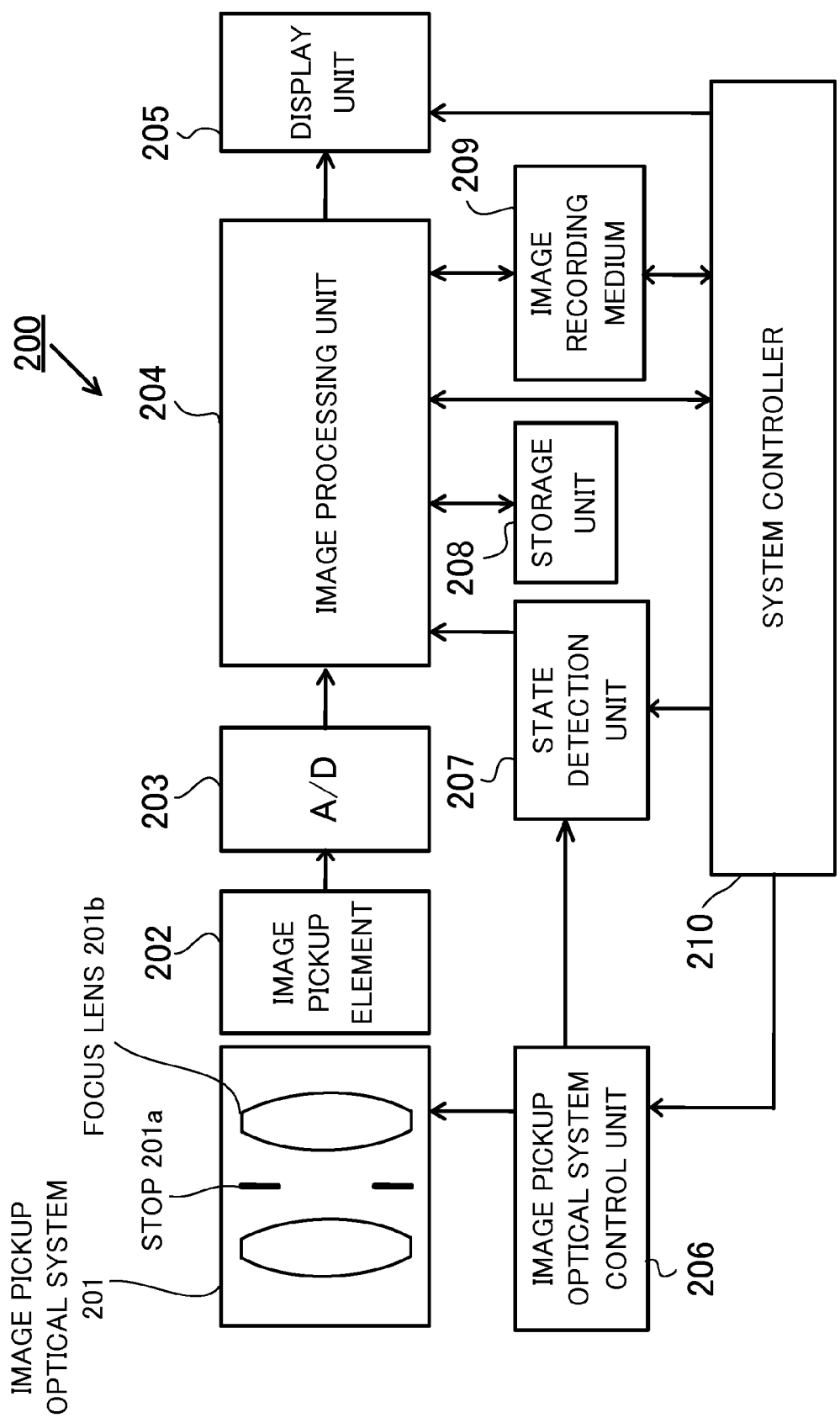
FIG. 21 is a configuration diagram of an image pickup apparatus in a first embodiment.

Next, referring to FIG. 21, an image pickup apparatus in the first embodiment of the present invention will be described. FIG. 21 is a configuration diagram of an image pickup apparatus 200 in this embodiment. An image processing program for performing color bleeding correction processing of a shot image (the above-described image processing method) is installed in the image pickup apparatus 200, and the color bleeding correction processing is performed by an image processing unit 204 (an image processing apparatus) provided in the image pickup apparatus 200.

The image pickup apparatus 200 includes an image pickup optical system 201 (a lens) and an image pickup apparatus body (a camera body). The image pickup optical system 201 includes a stop 201a and a focus lens 201b and is integrated with the image pickup apparatus body (the camera body). This embodiment is, however, not limited to this and is applicable also to an image pickup apparatus including the image pickup apparatus body (the camera body) to which the image pickup optical system 201 is interchangeably attached.

An image pickup element 202 photoelectrically converts an object image (an optical image) acquired via the image pickup optical system 201 to acquire an image (a shot image). That is, the object image is photoelectrically converted by the image pickup element 202 into an analog signal (an electrical signal). Thereafter, the analog signal is converted by an A/D converter 203 into a digital signal and then input to an image processing unit 204.

The image processing unit 204 (equivalent to the image processing apparatus 100) performs predetermined processing for the digital signal and performs the above-described color bleeding correction processing. The image processing unit 204 (a shooting condition acquisition unit) first acquires shooting condition information of the image pickup apparatus 200 from a state detection unit 207. The "shooting condition information" as used herein means information on a stop, a shooting distance, a focal length of a zoom lens, or the like. While the state detection unit 207 is capable of acquiring the shooting condition information directly from a system controller 210, applicable elements from which the shooting condition information is acquired are not limited to this. For instance, the shooting condition information on the image pickup optical system 201 can be acquired also from an image pickup optical system control unit 206. The color bleeding correction processing (the image processing method) of this embodiment is as described with reference to FIG. 1.

Optical information on a color-bleeding occurrence direction of the image pickup optical system 201 is stored in a storage unit 208. The image processing unit 204 acquires the optical information corresponding to the above-mentioned shooting condition from the storage unit 208 and then performs the color bleeding correction processing, and an image output from the image processing unit 204 is stored in an image recording medium 209 in a predetermined format. A display unit 205 displays an image for which the color bleeding correction processing of this embodiment is performed and then predetermined processing for display is performed. This embodiment is, however, not limited to this and the image processing unit 204 may alternatively be configured to display, on the display unit 205, an image for which a simplified processing is performed for high-speed display.

A series of control in this embodiment is performed by the system controller 210, and mechanical drive of the image pickup optical system 201 is performed by the image pickup optical system control unit 206 based on an instruction (a command) of the system controller 210. The image pickup optical system control unit 206 controls an aperture diameter of the stop 201a as shooting state setting of an F number. In addition, the image pickup optical system control unit 206 controls a position of the focus lens 201b by using an autofocusing mechanism or a manual focusing mechanism (both not illustrated), in order to perform focusing depending on an object distance. Functions such as the control of the aperture diameter of the stop 201a and manual focusing are not necessarily required to be performed depending on specifications of the image pickup apparatus 200. Additionally, an optical element such as a low-pass filter and an infrared cut filter can be provided to the image pickup optical system 201.

[Second Embodiment]

Figure 22:
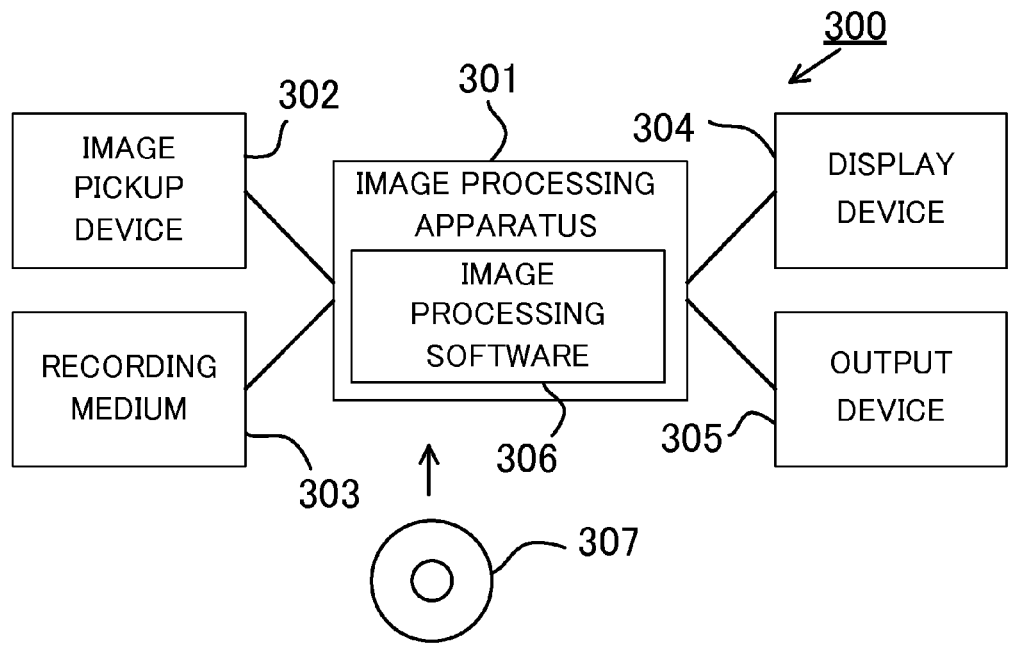
FIG. 22 is a configuration diagram of an image processing system in a second embodiment.

Next, referring to FIG. 22, an image processing system in the second embodiment of the present invention will be described. FIG. 22 is a configuration diagram of an image processing system 300 in this embodiment. Since the color bleeding correction processing (the image processing method) of this embodiment is as described with reference to FIG. 1, a description thereof will be omitted.

In FIG. 22, an image processing apparatus 301 (equivalent to the image processing apparatus 100) is a computer device in which image processing software 306 is installed that causes a computer to execute the image processing method of this embodiment. An image pickup device 302 is an image pickup apparatus such as a camera, a microscope, an endoscope, or a scanner. A storage medium 303 is a storage unit storing a shot image such as a semiconductor memory, a hard disk, or a server on a network.

The image processing apparatus 301 acquires shot image data from the image pickup device 302 or the storage medium 303 and then outputs the image data for which predetermined image processing has been performed to one or more of an output device 305, the image pickup device 302, and the storage medium 303. The output data can be stored also in a storage built in the image processing apparatus 301. The output device 305 is, for example, a printer. It is also possible to install the image processing software 306 in the image processing apparatus 301 from a storage medium such as a network or a CD-ROM 307.

A display device 304, which is a monitor, is connected to the image processing apparatus 301. This connection allows a user to perform image processing operations via the display device 304 and to evaluate the corrected image. In addition to the color bleeding correction processing (the image processing method) of this embodiment, the image processing software 306 performs development and other image processing as needed.

It is preferable to attach contents of data for performing the image processing in this embodiment and information on receiving and transmission of the data (correction information) to individual image data. The attachment of required correction information to each image data enables a device on which the image processing apparatus of this embodiment is mounted to appropriately perform the correction processing of this embodiment.

According to the above embodiments, it is possible to reduce a detrimental effect of eliminating the color of the object by storing the optical information on the color-bleeding occurrence direction of the image pickup optical system and determining the color bleeding correction region based on the result of the monotonic increase/decrease detection and the optical information, which enables acquiring a high-quality image. Therefore, according to the embodiments, it is possible to provide an image processing apparatus capable of performing satisfactory image restoration processing, an image pickup apparatus, an image pickup system, an image processing program and a non-transitory computer-readable storage medium.

The optical information on the color-bleeding occurrence direction of the image pickup optical system may be acquired not only by a method of reading the same from the device on which the image processing apparatus of this embodiment is mounted, but also via a network or from a PC, a camera or a lens.

[Third Embodiment]

Next, referring to FIGS. 31A and 31B, a description will be given of an image processing apparatus and an image processing method in the third embodiment of the present invention. FIG. 31A is a block diagram of an image processing apparatus 1000 in this embodiment. FIG. 31B is a flowchart of the image processing method (an image processing program) in this embodiment. Each step of FIG. 31B is performed based on a command (an instruction) of the image processing apparatus 1000, namely, by each unit of the image processing apparatus 1000. The basic configuration of the image processing apparatus 1000 in this embodiment is common to that of the image processing apparatus 100 described with reference to FIG. 1A except that the image processing apparatus 1000 further includes a first correction unit 1102. In addition, the basic flow (steps S101, S103 to S106) of the image processing method is common to that of the image processing method (steps S1 to S5) described with reference to FIG. 1B except that the image processing method of this embodiment further includes the step of correcting a chromatic aberration of magnification (step S102).

As illustrated in FIG. 31A, the image processing apparatus 1000 includes an input unit 1101, a first correction unit 1102 (an aberration correction unit), a detection unit 1103, a determination unit 1104, a second correction unit 1105 (a color-bleeding correction unit), an output unit 1106, and a storage unit 1107. First, at step S101 of FIG. 31B, the image processing apparatus 1000 (the input unit 1101) acquires a shot image as an input image. The input image is a digital image (the shot image) acquired by receiving light with an image pickup element via an image pickup optical system and is deteriorated due to an aberration caused by the image pickup optical system including a lens and various optical filters. The image pickup optical system may be constituted not only by the lens, but also by a mirror (a reflective surface) having a curvature.

A color component of the input image contains, for example, information of R, G, and B color components. Commonly used color spaces such as lightness, hue, and saturation, which are denoted by LCH, and brightness and color-difference signal, which are denoted by YCbCr, can be selected and used as other color component. As other color spaces, XYZ, Lab, Yuv, and JCh can be used. Moreover, color temperature may also be used. The shot image can be acquired by connecting an image pickup apparatus and the image processing apparatus 1000 by wire or wirelessly. The shot image can be also acquired via a non-transitory computer-readable storage medium.

Subsequently, at step S102, the image processing apparatus 1000 (the first correction unit 1102) corrects a chromatic aberration of magnification (a color shift) of the input image (the shot image) acquired via the input unit 1101 (a chromatic aberration of magnification correction process). In this embodiment, the first correction unit 1102 performs two types of processing (first correction processing and second correction processing). The first correction processing is processing for correcting a difference between magnifications (sizes of an image) of the image pickup optical system in different colors, more specifically, correction processing of the chromatic aberration of magnification (a first chromatic aberration of magnification) which remains in a design value. Any reference to "chromatic aberration of magnification" in this embodiment means the first chromatic aberration of magnification. The second correction processing is processing for correcting an aberration (a second chromatic aberration of magnification) equivalent to a deviation from the design value which occurs in a manufacturing process of the image pickup optical system. In this embodiment, for convenience, the second chromatic aberration of magnification is referred to as an "asymmetrical chromatic aberration of magnification".

(Detection and Correction of Chromatic Aberration of Magnification)

Figure 27A:
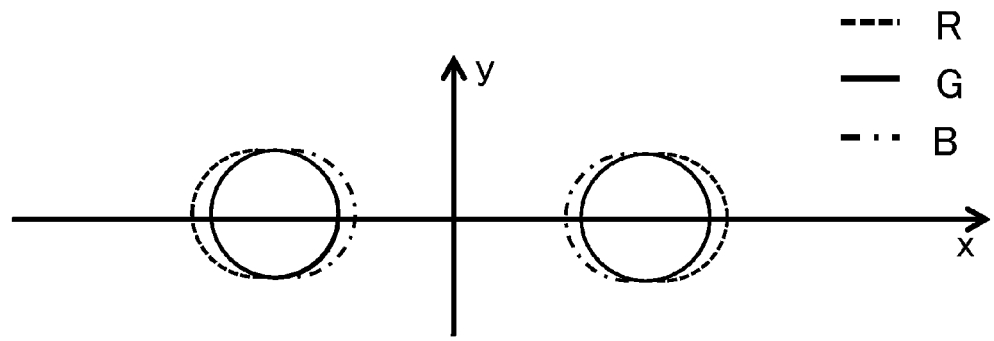
FIGS. 27A and 27B are explanatory diagrams of the chromatic aberration of magnification (the first chromatic aberration of magnification) in the third embodiment.
Figure 27B:
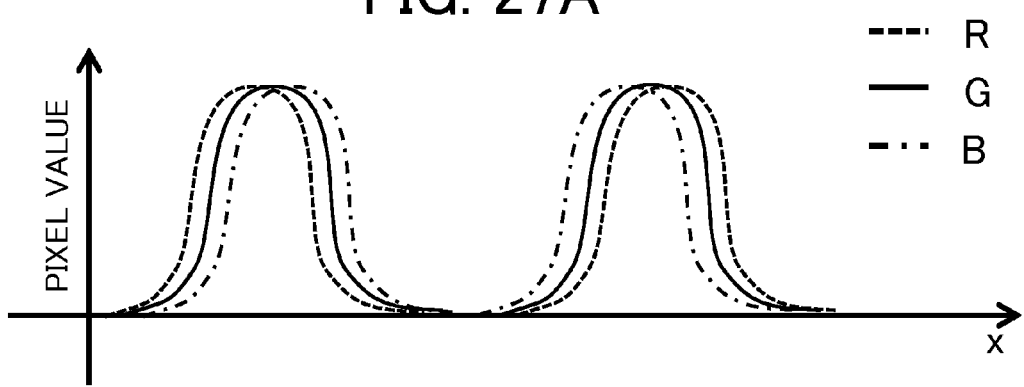

First, referring to FIGS. 27A and 27B, a description will be given of the correction of the chromatic aberration of magnification (the first chromatic aberration of magnification) which remains in the design value. FIGS. 27A and 27B are explanatory diagrams of the first chromatic aberration of magnification. FIG. 27A is a simulation diagram of the input image in which the chromatic aberration of magnification remains and FIG. 27B is a cross-sectional view along a horizontal direction (an X direction) of FIG. 27A. In FIG. 27A, an x axis, a y axis, and an intersection of the x axis and the y axis indicate a position in the horizontal direction, a position in a vertical direction, and a center of the image (the input image), respectively. A solid line, a dotted line, and a dashed-dotted line in each of FIGS. 27A and 27B indicate a G plane, an R plane, and a B plane, respectively.

An assumption is made that, in FIGS. 27A and 27B, the optical system is a coaxial system, aberrations other than the chromatic aberration of magnification have been corrected, and intensity shapes of an original image in the R, G, and B planes match with each other and are displaced from each other by an amount of the chromatic aberration of magnification. In this case, as illustrated in FIG. 27B, a pixel value of the B plane is higher than those of the R and G planes at a low-image-height side (the intersection of the x axis and the y axis). Therefore, in a region at the low-image-height side, the image looks like bleeding in blue (looks having the color bleeding). On the other hand, at a high-image-height side (an opposite side of the intersection of the x axis and the y axis), the pixel value of the R place is higher than those of the G and B planes. Therefore, in a region at the high-image-height side, the image looks like bleeding in red (looks having the color bleeding).

Performing color bleeding correction in this state causes, as illustrated in FIGS. 27A and 27B, the image to be processed with an erroneous assumption that the color bleeding occurs in the image even in a state in which the R, G, and B planes are displaced due to influence of the chromatic aberration of magnification. This makes it impossible to properly perform the color bleeding correction, which consequently may make it impossible to restore (correct) a color of the input image to an original color thereof. For instance, in FIGS. 27A and 27B, an attempt to perform the color bleeding correction until shapes of the R, G, and B planes match with each other may cause edge portions to be cut compared to those of an original shape of the image because a portion at which the R, G, and B planes overlap is an inner portion. Similarly, an attempt to cause the shapes of the R and B planes to correspond to that of the G plane in order for the edge portions not to be cut causes the R plane to have, at the low-image-height side, a lower pixel value and, on the other hand, the B plane to have, at the high-image-height side, a lower pixel value. This may result in problems such as occurrence of color void. In order to avoid these problems, in this embodiment, color bleeding correction described later is performed after the chromatic aberration of magnification correction processing. This enables appropriately correct the color bleeding of an object caused by the optical system with high accuracy.

Figure 23:
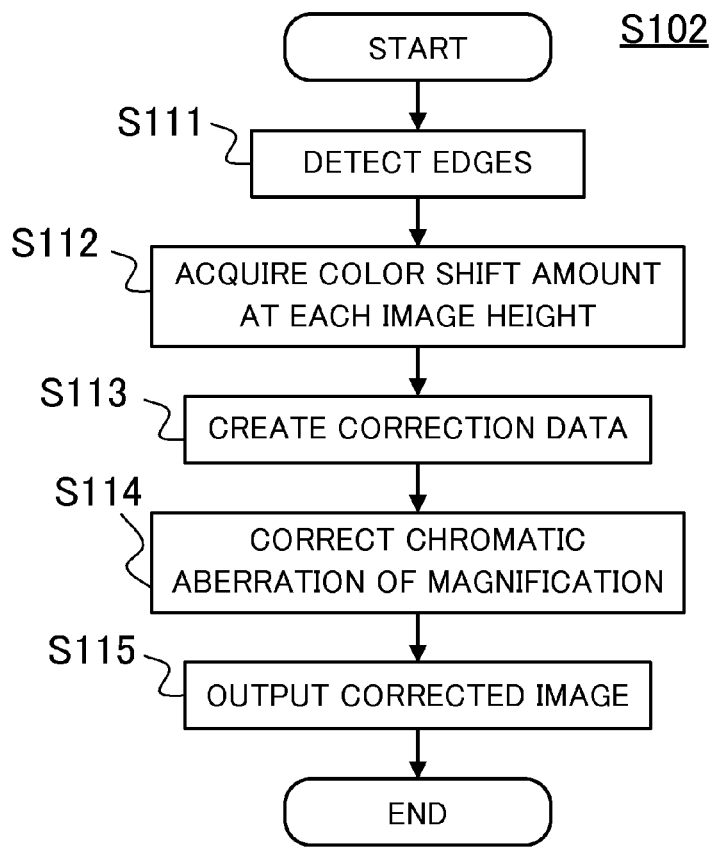
FIG. 23 is a flowchart illustrating correction processing (first correction processing) of a chromatic aberration of magnification (a first chromatic aberration of magnification) in a third embodiment.
Figure 24A:
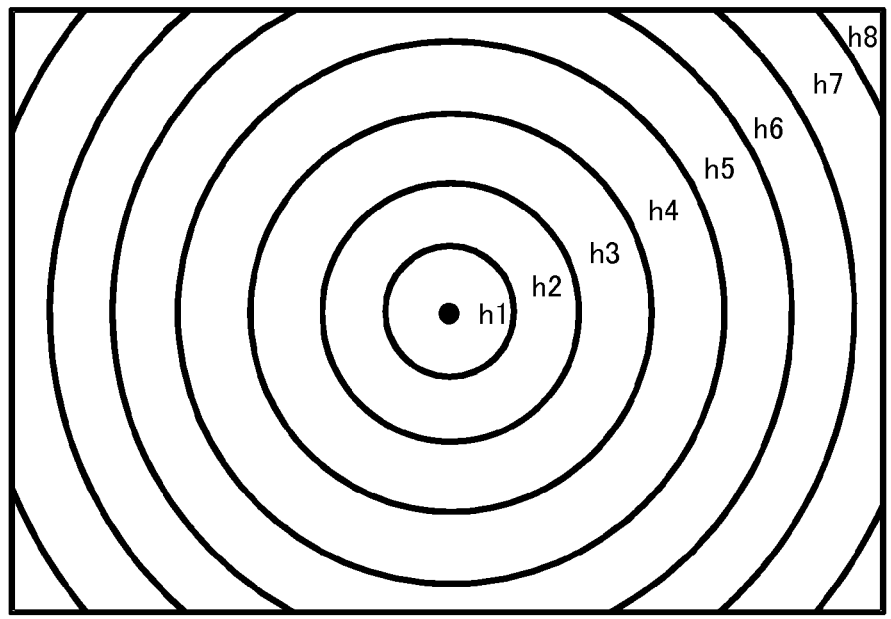
FIGS. 24A and 24B are explanatory diagrams of the correction processing of the chromatic aberration of magnification in the third embodiment.
Figure 24B:
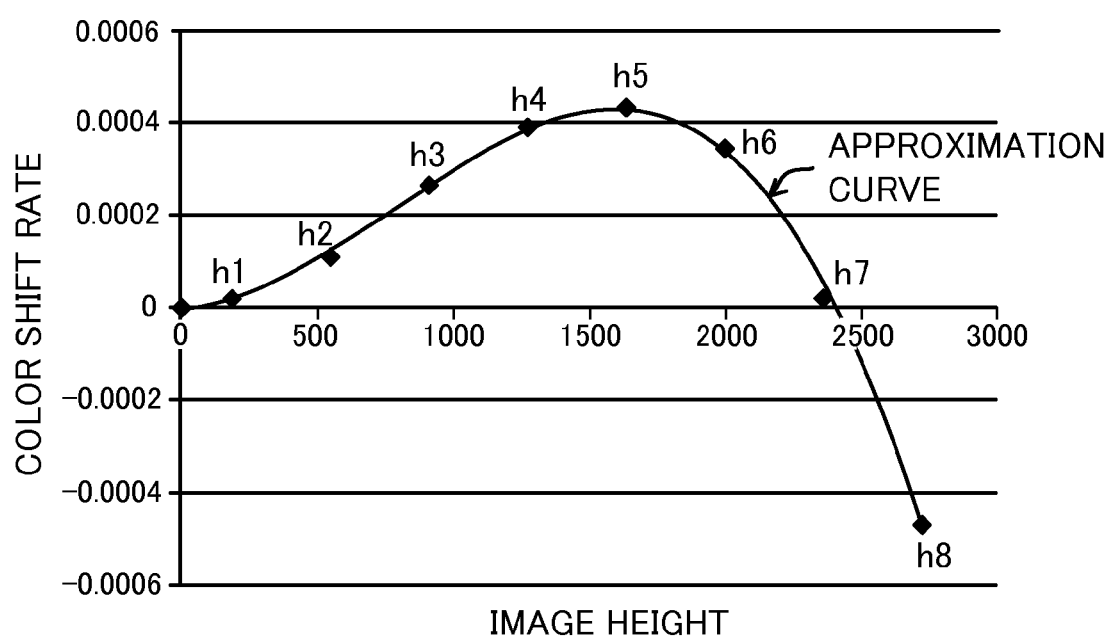

Next, referring to FIGS. 23, 24A, and 24B, a description will be given of a method of detecting the chromatic aberration of magnification from the input image and correcting the same. FIG. 23 is a flowchart illustrating the correction processing (the first correction processing) of the chromatic aberration of magnification (the first chromatic aberration of magnification). Each step of FIG. 23 constitutes part of step S102 of FIG. 31B. FIGS. 24A and 24B are explanatory diagrams of the correction processing of the chromatic aberration of magnification.

First, at step S111 of FIG. 23, the image processing apparatus 1000 (the first correction unit 1102) detects, from the input image, edges (edge regions) at which the color shift due to the chromatic aberration of magnification noticeably appears. In this embodiment, the first correction unit 1102 uses a Y (brightness) plane to detect the edge. Preferably, edges to be detected are limited to edges at which the pixels value largely varies in a direction of a radius vector from an optical center. This allows acquiring a highly-accurate color shift amount. The color shift due to the chromatic aberration of magnification appears in a mixed manner on the Y plane. For this reason, it is desirable to detect edges having a width of certain degree where the pixel value monotonically increases or monotonically decreases at multiple sequences of pixels.

Subsequently, at step S112, the first correction unit 1102 acquires a color shift amount at each edge (each edge region) detected at step S111. In this step, applying either of upward and downward directions, leftward and rightward directions, upper-rightward and upper-leftward directions, and lower-leftward and lower-rightward directions as a direction of the color shift depending on a positional relationship between the optical center and each edge enables simplifying the processing.

In acquiring the color shift amount at each edge, a correlation between the color components is used. For instance, determining a sum of difference absolute values of the color components enables acquiring the color shift amount. A place where the sum of the difference absolute values of the color components is the smallest is searched on pixels located near the detected edges while moving the R plane (or the B plane) in a color shift direction with respect to the G plane. It is possible to determine an amount of the color shift of the R plane (or the B plane) with respect to the G plane based on the position at which the sum of the difference absolute values is the smallest. A sign of the color shift amount required by step S112 is indicated by a minus (−) when the R plane (or the B plane) is displaced with respect to the G plane in the optical center direction and is indicated by a plus (+) when the R plane (or the B plane) is displaced with respect to the G plane in a direction opposite to the optical center.

Subsequently, at step S113, the first correction unit 1102 determines a relationship between each image height and the corresponding color shift amount based on an image height of each edge detected at step S111 and on the color shift amount of each edge acquired at step S112 and then creates correction data. The "image height" as used herein means a distance from a pixel equivalent to the optical center (the optical center). The correction data is created by the following process.

First, where the image height of each edge detected at step S111 is defined as L and the color shift amount acquired at step S113 is defined as D, a color shift rate M with respect to the image height L is determined as represented by the following Expression (15).

$$M = L/(L+D) \quad (15)$$

Subsequently, as illustrated in FIG. 24A, the first correction unit 1102 divides the input image into eight regions (h1 to h8) depending on the image height and determines a region to which each detected edge belongs. Thereafter, with respect to the multiple edges detected in the input image, the first correction unit 1102 calculates the above-mentioned color shift rate M and determines the region to which each edge belongs. In addition, the first correction unit 1102 sums up the color shift rates M for each of the eight regions divided depending on the image height, determines an average value of the color shift rate M for each region, and sets the color shift rate M of each region.

Subsequently, as illustrated in FIG. 24B, the first correction unit 1102 determines a high-order multiple term approximation F (L) representing the relationship between the image height and the color shift rate M based on the image height and the determined color shift rate M and sets the approximation F (L) as the correction data. FIG. 24B illustrates an example of the correction data calculated by a third-order multiple term expression.

The detection of the edges and the acquisition of the color shift amount may be performed for all the edges in a screen (image). However, discontinuing the detection of the edges and the acquisition of the color shift amount when the color shift rates M of greater number than a predetermined threshold has been summed up for the eight regions divided depending on the image height enables improving an efficiency of the processing with a reliability maintained. Moreover, using, of the eight regions divided depending on the image height, only regions in which the corresponding edges have been found for the calculation of the high-order multiple term expression enables creating the correction data even if there is any region in which the corresponding edges have not been found.

Subsequently, at step S114 of FIG. 23, the first correction unit 1102 uses the correction data created at step S113 to correct the color shift (the chromatic aberration of magnification). First, for pixels (X, Y) located on the planes to be corrected (the R and B planes), the first correction unit 1102 determines the color shift rate M based on the image height L of each of the pixels (X, Y) as represented by the following Expression (16). A coordinate system for this determination is regarded as a coordinate system whose optical center is (0, 0).

$$M = F(L) \quad (16)$$

Subsequently, as represented by the following Expressions (17-1) and (17-2), the first correction unit 1102 determines coordinates (X1, Y1) of each pixel generated by the color shift correction.

$$X1 = M \times X \quad (17\text{-}1)$$

$$Y1 = M \times Y \quad (17\text{-}2)$$

The first correction unit 1102 generates, by common interpolation processing, a pixel value corresponding to the coordinates (X1, Y1) for the planes to be corrected and sets the generated pixels value as a pixel value of the pixel (X, Y). The color shift correction is performed by performing the processing for all pixels. Thereafter, at step S115, the first correction unit 1102 outputs a corrected image.

(Detection and Correction of Asymmetrical Chromatic Aberration of Magnification)

Figure 28A:
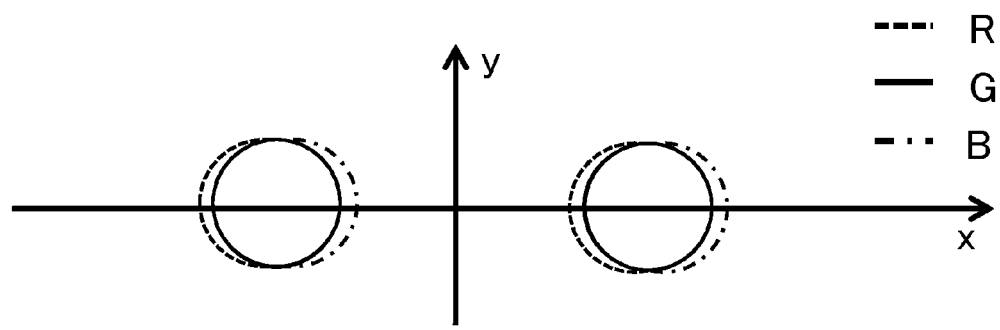
FIGS. 28A and 28B are explanatory diagrams of the asymmetrical chromatic aberration of magnification (the second chromatic aberration of magnification) in the third embodiment.
Figure 28B:
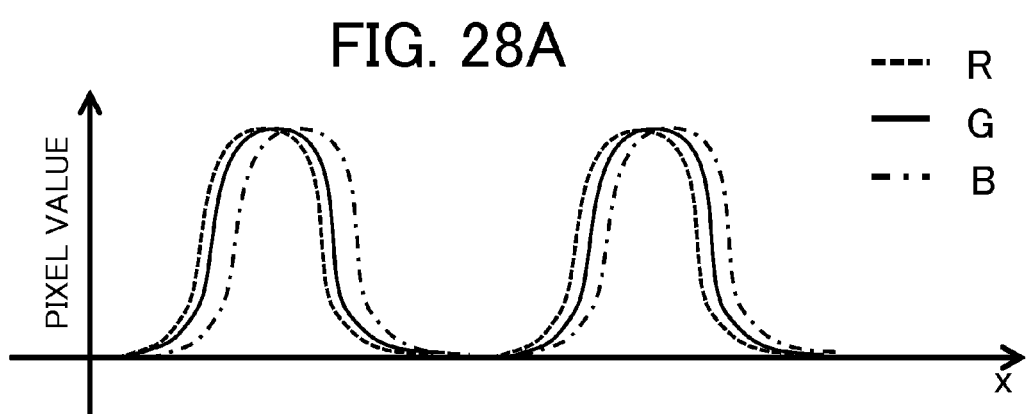

Next, referring to FIGS. 28A and 28B, a description will be given of the correction of the asymmetrical chromatic aberration of magnification (the second chromatic aberration of magnification) which occurs in the manufacturing process of the image pickup optical system. FIGS. 28A and 28B are explanatory diagrams of the asymmetrical chromatic aberration of magnification in this embodiment. FIG. 28A is a simulation diagram of an input image in which the asymmetrical chromatic aberration of magnification remains and FIG. 28B is a cross-sectional view along a horizontal direction (an X direction) of FIG. 28A. In FIG. 28A, an x axis, a y axis, and an intersection of the x axis and the y axis indicate a position in the horizontal direction, a position in a vertical direction, and a center of the image (the input image), respectively. A solid line, a dotted line, and a dashed-dotted line in each of FIGS. 28A and 28B indicate a G plane, an R plane, and a B plane, respectively.

In FIGS. 28A and 28B, the optical system is deemed to deviate from a perfect rotational symmetrical system due to influence of a shape error in its manufacturing process or a tilt or a shift of the lens. In addition, similarly to FIGS. 27A and 27B, an assumption is made that aberrations other than the chromatic aberration of magnification have been corrected, and intensity shapes of an original image in the R, G, and B planes match with each other and are displaced from each other by an amount of the chromatic aberration of magnification. When affected by the asymmetrical chromatic aberration of magnification as illustrated in FIGS. 28A and 28B, the color bleeding occurs differently from FIGS. 27A and 27B in which the color bleeding occurs symmetrically with respect to the center of the image even when objects with the same intensity and the same color are located at symmetrical positions with respect to the center of the image.

In FIGS. 28A and 28B, an object located at the left with respect to the y axis has a higher pixel value of the B plane than pixel values of the R and G planes at a low-image-height side and has a higher pixel value of the R plane than pixel values of the G and B planes at a high-image-height side. Conversely, an object located at the right with respect to the y axis has a higher pixel value of the R plane than pixel values of the G and B planes at the low-image-height side and has a higher pixel value of the B plane than pixel values of the R and G planes at the high-image-height side. As described above, if the color bleeding occurs asymmetrically with respect to the center of the image due to the asymmetrical chromatic aberration of magnification, performing only the correction processing (the first correction processing) described with reference to FIGS. 27A and 27B cannot correct this asymmetrical chromatic aberration of magnification. Moreover, performing the color bleeding correction described later in this state causes the color shift due to the asymmetrical chromatic aberration of magnification to be processed with an erroneous assumption that the color bleeding occurs and thus cannot properly correct the asymmetrical chromatic aberration of magnification, which may result in a situation that the color of the image cannot be restored to an original color.

In FIGS. 28A and 28B, an attempt to correct the color bleeding until shapes of the R, G, and B planes match with each other may cause edge portions to be cut compared to those of an original shape of the image because a portion at which the R, G, and B planes overlap is an inner portion. Similarly, an attempt to cause the shapes of the R and B planes to correspond to that of the G plane in order for the edge portions not to be cut causes, with respect to the object located at the left with respect to the y axis, the R plane to have, at the low-image-height side, a pixel value lower than that of the G plane and the B plane to have, at the high-image-height side, a pixel value lower than that of the G plane, which may cause the color void. On the other hand, in FIGS. 28A and 28B, this attempt causes, with respect to the object located at the right with respect to the y axis, the B plane to have, at the low-image-height side, a pixel value lower than that of the G plane and the R plane to have, at the high-image-height side, a pixel value lower than that of the G plane. For this reason, as described above, even when an object with the same intensity and the same color is located at a position symmetrical to that of the object located at the left side of the y axis, the color bleeding and the color void occur differently from those of the left side. In addition, even when the color bleeding at one of the sides of the y axis is appropriately corrected, the color bleeding at the other side is likely to be insufficiently or excessively corrected depending on a state of the asymmetrical chromatic aberration of magnification.

In order to avoid these problems, in this embodiment, the color bleeding correction processing described later is performed after the chromatic aberration of magnification (the first chromatic aberration of magnification) which remains in the design value and the asymmetrical chromatic aberration of magnification (the second chromatic aberration of magnification) are corrected. This enables appropriately correcting the color bleeding of the object caused by the optical system with high accuracy.

Figure 25:
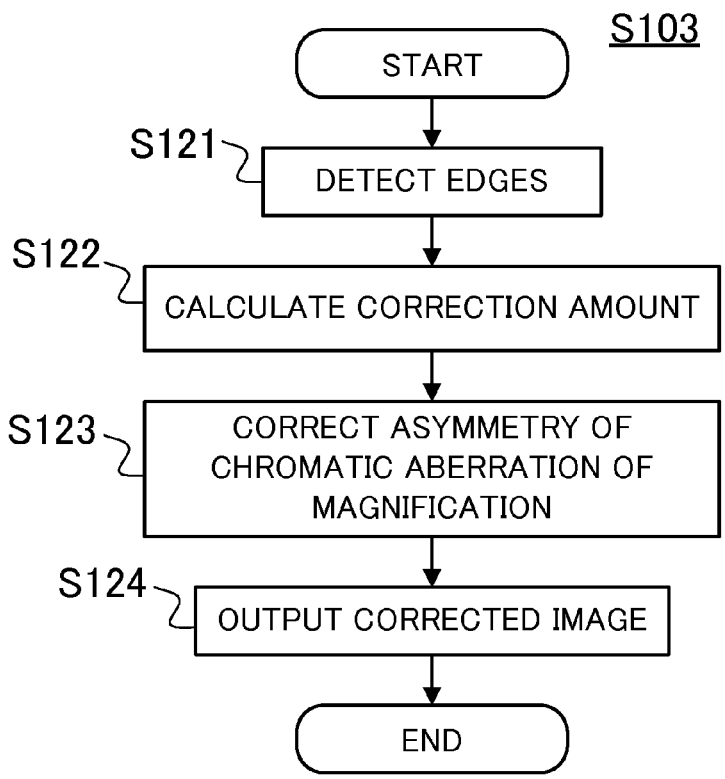
FIG. 25 is a flowchart illustrating correction processing (second correction processing) of an asymmetrical chromatic aberration of magnification (a second chromatic aberration of magnification) in the third embodiment.
Figure 26:
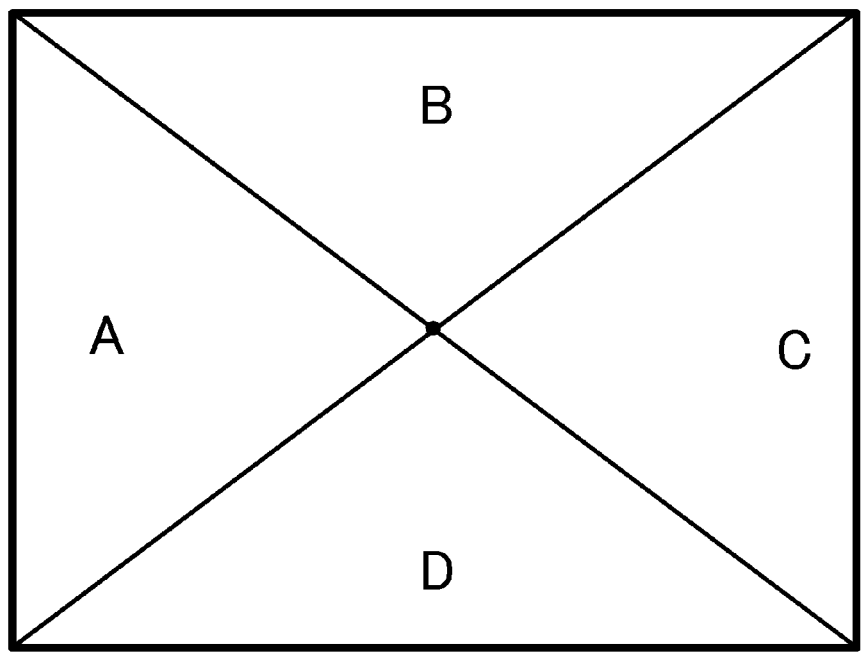
FIG. 26 is an explanatory diagram of the correction processing of the asymmetrical chromatic aberration of magnification (the second chromatic aberration of magnification) in the third embodiment.

Next, referring to FIGS. 25 and 26, a description will be given of a method of detecting the asymmetrical chromatic aberration of magnification from the input image and correcting the same. FIG. 25 is a flowchart illustrating the correction processing (the second correction processing) of the asymmetrical chromatic aberration of magnification (the second chromatic aberration of magnification). Each step of FIG. 25 constitutes part of step S102 of FIG. 31B. FIG. 26 is an explanatory diagram of the correction processing of the asymmetrical chromatic aberration of magnification.

First, at step S121 of FIG. 25, the image processing apparatus 1000 (the first correction unit 1102) detects, from the input image, edges (edge regions) at which the color shift due to the chromatic aberration of magnification noticeably appears. In detecting the edges, a Y (brightness) plane is used.

Subsequently, at step S122, the first correction unit 1102 acquires a color shift amount with respect to each edge (edge region) detected at step S121 and calculates a correction amount (a correction amount for each of the plurality of divided regions of the shot image). In this step, either of upward and downward directions, leftward and rightward directions, upper-rightward and upper-leftward directions, and lower-leftward and lower rightward directions is applied as a direction of the color shift depending on a positional relationship between the optical center and each edge to simplify the processing. Since the acquisition of the color shift amount at each edge is as described above, a description thereof will be omitted. Thereafter, at step S123, the first correction unit 1102 uses the correction amount calculated at step S122 to correct the asymmetrical chromatic aberration of magnification (asymmetry of the chromatic aberration of magnification). A creation process of the correction data at step S122 and a flow of the correction at step S123 will be described in detail below.

First, at step S122, as illustrated in FIG. 26, the first correction unit 1102 divides the image into four regions (regions A to D) in a circumferential direction and determines regions to which the above-mentioned edges belong. Thereafter, the first correction unit 1102 sums up color shift amounts D for each of the divided regions with respect to the plurality of edges detected in the image, determines an average value of the color shift amount D for each region, and sets the color shift amount D of each region. Subsequently, the first correction unit 1102 compares the color shift amounts D of the calculated regions to sets correction amounts of the planes to be corrected (the R and B planes).

Where the correction amounts (each, a first correction amount) of the regions A, B, C, and D are defined as Da, Db, Dc, and Dd, respectively, a correction amount DH in the horizontal direction and a correction amount DV (each, a second correction amount) in the vertical direction are represented by the following Expression (18-1) and (18-2), respectively.

$$DH=(Dc-Da)/2 \qquad (18\text{-}1)$$

$$DV=(Db-Dd)/2 \qquad (18\text{-}2)$$

In this embodiment, the correction amount DH in the horizontal direction is calculated based on the color shift amounts of the regions A and C, and the correction amount DV in the vertical direction is calculated based on the color shift amounts of the regions B and D. In addition, differently from this embodiment in which the image is divided in the circumferential direction, dividing the image in an image height direction to vary the correction amount for each image height enables nonlinearly shifting the planes to be corrected.

When the image pickup optical system 201 is in a state of fully rotationally symmetrical, the relations of DH=0 and DV=0 are satisfied because the chromatic aberration of magnification also occurs rotationally symmetrically with respect to the center of the screen (image). On the other hand, a loss of the symmetry of the image pickup optical system 201 due to influence of a manufacturing error and the like causes the chromatic aberration of magnification to also be rotationally asymmetrical and thus the correction is performed by shifting the planes to be corrected toward the region C where the relation of Dc>Da (DH>0) is satisfied. On the other hand, the correction is performed by shifting the planes to be corrected toward the region A where the relation of Dc<Da (DH<0) is satisfied. Similarly, with respect also to the vertical direction, the correction is performed by shifting the planes to be corrected toward the region B where the relation of Db>Dd (DV>0) is satisfied and by shifting the planes to be corrected toward the region A where the relation of Dc<Dd (DH<0) is satisfied.

Subsequently, at step S123, the first correction unit 1102 uses the correction amount DH in the horizontal direction and the correction amount DV in the vertical direction as the correction data for the asymmetrical chromatic aberration of magnification caused by the manufacturing error and the like to correct the color shift. Each pixel of the planes to be corrected (the R and B planes) are defined as a pixel (X, Y). A coordinate (X2, Y2) of pixels generated by the color shift correction are represented by the following Expression (19-1) and (19-2) by using the correction amount DH in the horizontal direction and the correction amount DV in the vertical direction.

$$X2=X+DH \qquad (19\text{-}1)$$

$$Y2=Y+DV \qquad (19\text{-}2)$$

A coordinate system for Expressions (19-1) and (19-2) has an optical center at a coordinate (0, 0).

The first correction unit 1102 generates, by the common interpolation processing, a pixel value corresponding to the coordinate (X2, Y2) on the planes to be corrected and sets the generated pixel value as a pixel value of the pixel (X, Y). The color shift correction is performed by performing the processing for all pixels. While, in this embodiment, the image is divided into the four regions to calculate the correction amount as illustrated in FIG. 26, the image may be divided into eight regions to acquire the color shift amount for each region and then calculate the correction amount and perform the correction processing. As described above, at step S123, the first correction unit 1102 uses the correction amount (the second correction amount) in a direction different from a radial direction with respect to the center (optical center or correction center) of the shot image calculated based on the correction amount at step S122 to correct the second chromatic aberration of magnification. More preferably, the first correction unit 1102 uses the correction amounts of the shot image in the horizontal and vertical directions as the correction amounts in the direction different from the radial direction. Additionally, in this embodiment, the first correction amount and the second correction amount are different from each other at a first position and a second position which are symmetrical to the center of the shot image.

While the method of detecting the chromatic aberration of magnification (the first chromatic aberration of magnification) and the asymmetrical chromatic aberration of magnification (the second chromatic aberration of magnification) from the image and correcting them is as described above, the first correction unit 1102 may perform the correction processing also by additionally using information of the design value on the chromatic aberration of magnification caused by the optical system. The use of the information of the design value enables reducing the erroneous detection or treating the chromatic aberration of magnification as an amount of a shift from the design value as a reference.

Subsequently, at step S103, the image processing apparatus 1000 (the detection unit 1103) detects a region in which a pixel value (a signal level) of any of a plurality of color planes constituting a color image monotonically increases or monotonically decreases. Then, the detection unit 1103 temporarily determines the detected region as a color-bleeding occurrence region (a monotonic increase/decrease detection process). There are several possible methods of determining the color-bleeding occurrence region in the monotonic increase/decrease detection process. In this embodiment, the determination is performed based on a variation characteristic of the pixel value of the color bleeding in a certain pixel section (a predetermined section).

Since the color bleeding occurs due to a displacement of an imaging position in a direction along an optical axis depending on a wavelength, when there occurs the color bleeding in blue, for example, this means that a blue color plane (a B plane) is out of focus (defocused). The color bleeding caused by defocus is present over the certain pixel section, and a variation in the pixel value of the color bleeding in such situation has a characteristic that it gradually decreases from a highlighted portion of the image to a shadow portion. Therefore, when the variation in the pixel value of the color bleeding in the certain pixel section has a characteristic that it monotonically increases or monotonically decreases, the section is temporarily determined to be the color-bleeding occurrence region because the color bleeding may be occurring.

As described above, in this embodiment, the image pickup element includes a plurality of color filters. The detection unit 1103 detects the region (a first region) in which the signal level (the pixel value) of the color plane corresponding to at least one color filter of an image acquired from the image pickup element monotonically increases or monotonically decreases in a direction (a first direction) within the predetermined section. This embodiment is, however, not limited to this, and the detection unit 1103 may alternatively be configured to detect a region in which, instead of the signal level of the color plane, the signal level of a brightness plane (a Y plane) generated from the image acquired from the image pickup element monotonically increases or monotonically decreases. That is, the detection unit 1103 detects the first region in which the level of the color signal or the brightness signal (the signal level on the color plane or the brightness plane) of the shot image whose chromatic aberration of magnification has been corrected (an aberration-corrected image) monotonically increases or monotonically decreases in the first direction within the certain pixel section.

Incidentally, in actual cases, when the image pickup optical system causes the asymmetrical aberration such as the coma aberration, the color bleeding caused by the image pickup optical system with respect to the image of the object occurs in some directions and does not occur in other directions. Therefore, if the color-bleeding occurrence region is determined based only on the monotonic increase/decrease when the object has the same type of color as that of the color bleeding, the color of the object is likely to be determined to be the color bleeding in error. This means that the color-bleeding occurrence region cannot be correctly determined based only on the monotonic increase or the monotonic decrease.

In this embodiment, the region in which the monotonic increase or the monotonic decrease is detected includes either one of a pixel section in a horizontal, vertical, or oblique direction whose center is a target pixel of the color image and a pixel section in the horizontal, vertical, or oblique direction whose endpoint is the target pixel of the color image.

The detection of the monotonic increase or the monotonic decrease is performed by, as a first process, calculating an inclination of the pixel value of the color plane. When the input image is constituted by, for example, three color planes, namely, a G plane, a B plane, and an R plane, the B plane is chosen for which the color bleeding is to be removed and the G plane is used as a reference plane. A brightness inclination Blea with respect to the B plane and a brightness inclination Glea with respect to the G plane are calculated as represented by the above-mentioned Expression (1).

At step S102 of FIG. 31B, the first correction unit 1102 performs the correction processing of the two types of chromatic aberration of magnification. As described above, the first correction unit 1102 corrects the chromatic aberration of magnification (the first chromatic aberration of magnification) which remains at a phase of the design of the optical system and the asymmetrical chromatic aberration of magnification (the second chromatic aberration of magnification). While, as described above, the first correction unit 1102 performs the correction processing of both types of chromatic aberrations of magnification (the first correction processing and the second correction processing) in this embodiment, either of the two correction processing may be performed earlier such as correcting the asymmetrical chromatic aberration of magnification and then the chromatic aberration of magnification which remains at the phase of the design of the optical system.

Figure 29:
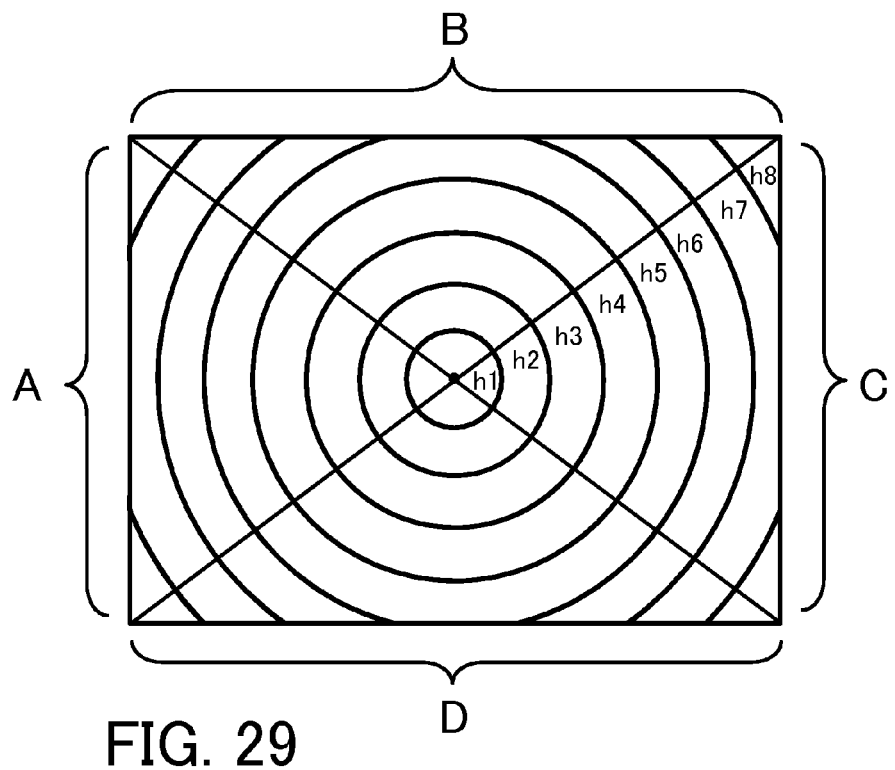
FIG. 29 is an explanatory diagram of the correction processing of the chromatic aberration of magnification and the asymmetrical chromatic aberration of magnification in the third embodiment.

Alternatively, the first correction unit 1102 may perform the two correction processing in parallel (concurrently or within the same period). As an example of methods of performing the two correction processing in parallel, each region of the image can be divided in the circumferential direction and the image-height direction as illustrated in FIG. 29 to calculate the correction amount for each divided region based on the color shift amount of the each divided region. Alternatively, the first correction unit 1102 may correct only the asymmetrical chromatic aberration of magnification (the second correction processing) at step S102 of FIG. 31B and correct the chromatic aberration of magnification (the first correction processing) which remains at the phase of the design of the optical system in the color bleeding correction performed at step S105. In this case, at step S105, the first correction unit 1102 is required to perform the color bleeding correction processing taking an amount of the color shift due to the chromatic aberration of magnification into consideration.

[Fourth Embodiment]

Next, an image pickup apparatus in the fourth embodiment of the present invention will be described. A correction method of a chromatic aberration of magnification performed by the image pickup apparatus of this embodiment is different from that of the third embodiment. Unlike the third embodiment in which the image processing unit 204 calculates the correction amount from the acquired image (the input image), in this embodiment, the image pickup apparatus stores information on the correction amount in a storage device (a storage unit 1107) and reads the information to perform the correction. Since other configuration of the image pickup apparatus of this embodiment is similar to that of the image pickup apparatus 200 of the first embodiment, a description thereof will be omitted.

Figure 30:
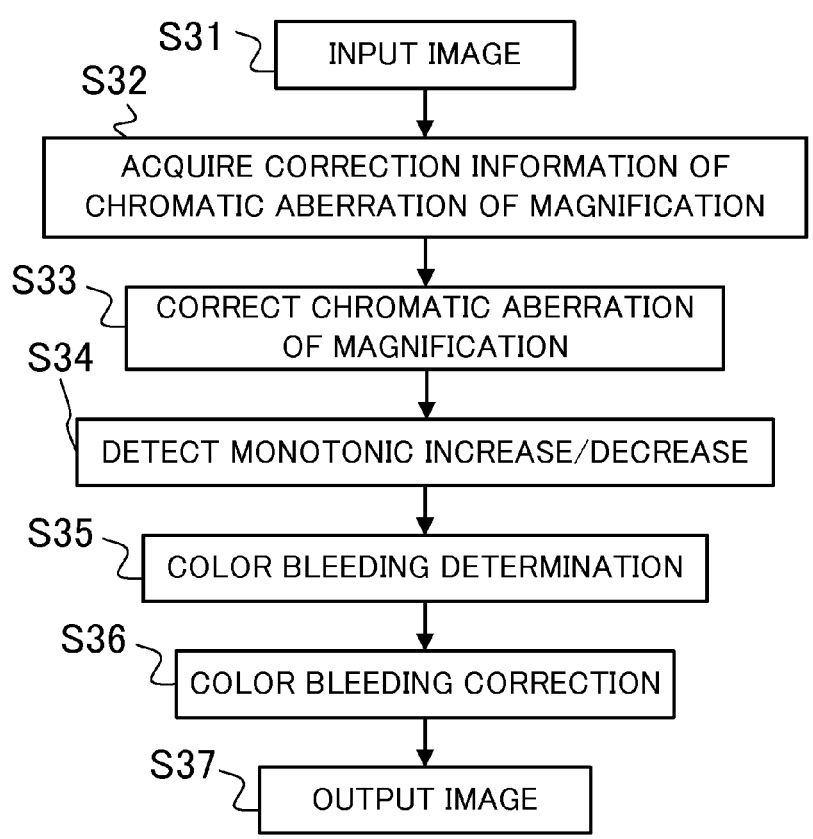
FIG. 30 is a flowchart illustrating an image processing method in a fourth embodiment.

Referring to FIG. 30, an image processing method (an image processing program) in this embodiment will be described. Each step of FIG. 30 is performed based on a command (an instruction) of the image processing apparatus 1000 (the image processing unit 204), namely, by each unit of the image processing apparatus 1000. Since steps S31 and S33 to S37 are the same as steps S101 to S106, respectively, a description thereof will be omitted.

First, at step S31, the image processing apparatus 1000 (an input unit 1101) acquires a shot image (an input image). Subsequently, at step S32, the image processing apparatus 1000 (a first correction unit 1102) acquires the information on the correction amount of the chromatic aberration of magnification (correction information of the chromatic aberration of magnification) stored in the storage device (the storage unit 1107). The information on the correction amount stored in the storage unit 1107 is information measured by using a chart or the like which indicates a value of a difference (a difference value) between a design value and an amount of the chromatic aberration of magnification (a shift amount). The information on the correction amount may be the measured difference value, an approximation value calculated based on the difference value, or a value processed to facilitate the correction. In addition, while the difference value between the design value and the amount of the chromatic aberration of magnification is set as the correction amount in this embodiment, applicable correction amounts are not limited to this and both of the difference value between the design value and the chromatic aberration of magnification and that between the design value and the asymmetrical chromatic aberration of magnification may be used as the correction amounts.

Subsequently, at step S33, the first correction unit 1102 uses the information on the correction amount (the correction information of the chromatic aberration of magnification) acquired at step S32 to correct the chromatic aberration of magnification. Since the acquired information on the correction amount contains information on the asymmetrical chromatic aberration of magnification which occurs in the manufacturing process of the optical system, performing the correction processing described in the third embodiment based on the information on the asymmetrical chromatic aberration of magnification enables reducing asymmetry. Since subsequent steps S34 to S37 are similar to steps S103 to S106 of the third embodiment, respectively, a description thereof will be omitted.

As described above, in this embodiment in which the information on the correction amount is required to be measured in advance, maintaining the information on the correction of the chromatic aberration of magnification enables reducing a calculation amount for the acquired image. Therefore, the configuration of the image pickup apparatus of this embodiment enables increase a speed of the processing and reducing a processing load. While, in this embodiment, the first correction unit 1102 acquires the difference value between the design value and the amount of each chromatic aberration of magnification as the correction information of the chromatic aberration of magnification at step S32, applicable correction information of the chromatic aberration of magnification is not limited to this. Alternatively, the first correction unit 1102 may measure the chromatic aberration of magnification instead of the difference value, store information on the chromatic aberration of magnification in the storage unit (the storage unit 1107), and uses the stored information as the correction information of the chromatic aberration of magnification.

Preferably, at the step of each embodiment at which the chromatic aberration of magnification is corrected, the corresponding unit detects the chromatic aberration of magnification from the shot image and determines the correction amount thereof based thereon. Alternatively, preferably, at the step of each embodiment at which the chromatic aberration of magnification is corrected, the corresponding unit determines the correction amount of the chromatic aberration of magnification based on the correction information of the chromatic aberration of magnification stored.

Preferably, at the step at which the chromatic aberration of magnification is corrected, the first correction unit 1102 corrects the first chromatic aberration of magnification contained as the design value of the image pickup optical system. In addition, preferably, at the step at which the chromatic aberration of magnification is corrected, the correction unit 1102 corrects the second chromatic aberration of magnification equivalent to the difference between the design value of the image pickup optical system and the amount of the chromatic aberration of magnification.

According to the embodiments, the use of a monotonic-increase or monotonic-decrease determination on a pixel value of each color plane and information on a color-bleeding occurrence direction of an imaging optical system in the color bleeding correction processing of a color image enables reducing a detrimental effect of eliminating an original color of an object, which makes it possible to effectively correct the color bleeding. Therefore, according to the embodiments, it is possible to provide an image processing apparatus capable of effectively reducing the color bleeding in the color image, an image pickup apparatus, an image pickup system, an image processing method, an image processing program, and a non-transitory computer-readable storage medium.

[Other Embodiments]

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-210726, filed on Oct. 8, 2013, and Japanese Patent Application No. 2014-106400, filed on May 22, 2014, which are hereby incorporated by reference herein in their entirety.

What is claimed is:

1. An image processing apparatus comprising:
   a detection unit configured to detect a first region in which one of a signal level of a color plane corresponding to at least one color filter of an image acquired from an image pickup element including a plurality of color filters and a signal level of a brightness plane generated from the image monotonically increases or monotonically decreases in a first direction within a predetermined section;
   a determination unit configured to determine a second region in which color bleeding of an image pickup optical system occurs, based on optical information on the color bleeding and information on the first region; and
   a correction unit configured to correct the image so as to reduce the color bleeding,
   wherein the optical information is information on a second direction in which the color bleeding of the image pickup optical system occurs, and
   wherein the determination unit is configured to compare the first direction with the second direction to determine the second region.

2. The image processing apparatus according to claim 1, wherein the determination unit is configured to determine that the first region is the second region when the first direction and the second direction match with each other.

3. The image processing apparatus according to claim 2, wherein the correction unit is configured to calculate information on the color bleeding in a plurality of directions to correct the image when the first direction and the second direction match with each other in the plurality of directions.

4. The image processing apparatus according to claim 3, wherein the correction unit is configured to use the information on the intensity of the color bleeding in a centroid direction of the plurality of directions to correct the image when the first direction and the second direction match with each other in the plurality of directions.

5. The image processing apparatus according to claim 1, wherein the optical information is information on an intensity of the color bleeding of the image pickup optical system.

6. The image processing apparatus according to claim 5, wherein the correction unit is configured to change a strength of correcting the image based on the information on the intensity of the color bleeding.

7. The image processing apparatus according to claim 1, further comprising a storage unit configured to store optical information for each of at least one or more shooting conditions.

8. The image processing apparatus according to claim 7, wherein the at least one or more shooting conditions include one of a focal length, an object distance, or an aperture value of the image pickup optical system.

9. An image pickup apparatus comprising:
   an image pickup element configured to photoelectrically convert an optical image;
   a detection unit configured to detect a first region in which one of a signal level of a color plane corresponding to at least one color filter of an image acquired from the image pickup element including a plurality of color filters and a signal level of a brightness plane generated from the image monotonically increases or monotonically decreases in a first direction within a predetermined section;
   a determination unit configured to determine a second region in which color bleeding of an image pickup optical system occurs, based on optical information on the color bleeding and information on the first region; and
   a correction unit configured to correct the image so as to reduce the color bleeding,
   wherein the optical information is information on a second direction in which the color bleeding of the image pickup optical system occurs, and
   wherein the determination unit is configured to compare the first direction with the second direction to determine the second region.

10. An image pickup system comprising:
    a lens apparatus including an image pickup optical system; and
    an image pickup apparatus,
    wherein the image pickup apparatus includes:
    an image pickup element configured to photoelectrically convert an optical image;
    a detection unit configured to detect a first region in which one of a signal level of a color plane corresponding to at least one color filter of an image acquired from the image pickup element including a plurality of color filters and a signal level of a brightness plane generated from the image monotonically increases or monotonically decreases in a first direction within a predetermined section;
    a determination unit configured to determine a second region in which color bleeding of the image pickup optical system occurs, based on optical information on the color bleeding and information on the first region; and
    a correction unit configured to correct the image so as to reduce the color bleeding,
    wherein the optical information is information on a second direction in which the color bleeding of the image pickup optical system occurs, and
    wherein the determination unit is configured to compare the first direction with the second direction to determine the second region.

11. An image processing method comprising the steps of:
    detecting a first region in which one of a signal level of a color plane corresponding to at least one color filter of an image acquired from an image pickup element including a plurality of color filters and a signal level of a brightness plane generated from the image monotonically increases or monotonically decreases in a first direction within a predetermined section;
    determining a second region in which color bleeding of an image pickup optical system occurs, based on optical information on the color bleeding and information on the first region; and
    correcting the image so as to reduce the color bleeding,
    wherein the optical information is information on a second direction in which the color bleeding of the image pickup optical system occurs, and
    wherein the determination unit is configured to compare the first direction with the second direction to determine the second region.

12. A non-transitory computer-readable storage medium storing an image processing program configured to cause a computer to execute a process comprising the steps of:
    detecting a first region in which one of a signal level of a color plane corresponding to at least one color filter of an image acquired from an image pickup element including a plurality of color filters and a signal level of a brightness plane generated from the image monotonically increases or monotonically decreases in a first direction within a predetermined section;
    determining a second region in which color bleeding of an image pickup optical system occurs, based on optical information on the color bleeding and information on the first region; and
    correcting the image so as to reduce the color bleeding,
    wherein the optical information is information on a second direction in which the color bleeding of the image pickup optical system occurs, and
    wherein the determination unit is configured to compare the first direction with the second direction to determine the second region.

13. An image processing method comprising the steps of:
    correcting a chromatic aberration of magnification of a shot image;
    detecting a first region in which a level of at least one of a color signal and a brightness signal of the shot image in which the chromatic aberration of magnification has been corrected monotonically increases or monotonically decreases in a first direction within a predetermined section;
    determining a second region in which color bleeding of an image pickup optical system occurs, based on optical information on the color bleeding and information on the first region; and
    correcting the shot image in which the chromatic aberration of magnification has been corrected, so as to reduce the color bleeding,
    wherein the optical information is information on a second direction in which the color bleeding of the image pickup optical system occurs, and
    wherein the determination unit is configured to compare the first direction with the second direction to determine the second region.

14. The image processing method according to claim 13, wherein the step of correcting the chromatic aberration of magnification includes the steps of:
   detecting the chromatic aberration of magnification based on the shot image; and
   determining a correction amount of the chromatic aberration of magnification based on the detected chromatic aberration of magnification.

15. The image processing method according to claim 13, wherein the step of correcting the chromatic aberration of magnification includes the step of determining a correction amount of the chromatic aberration of magnification based on correction information of a previously-stored chromatic aberration of magnification.

16. The image processing method according to claim 13, wherein the step of correcting the chromatic aberration of magnification includes the step of correcting a first chromatic aberration of magnification contained as a design value of the image pickup optical system.

17. The image processing method according to claim 16, wherein the step of correcting the chromatic aberration of magnification includes the steps of:
   detecting an edge region of the shot image;
   acquiring a color shift amount in the edge region;
   creating correction data based on an image height of the edge region and the color shift amount; and
   using the correction data to correct the first chromatic aberration of magnification.

18. The image processing method according to claim 13, wherein the step of correcting the chromatic aberration of magnification includes the step of correcting a second chromatic aberration of magnification corresponding to a difference from a design value of the image pickup optical system.

19. The image processing method according to claim 18, wherein the step of correcting the chromatic aberration of magnification includes the steps of:
   detecting an edge region of the shot image;
   calculating a first correction amount with respect to each of a plurality of divided regions of the shot image based on a color shift amount of the edge region; and
   correcting the second chromatic aberration of magnification by using a second correction amount in a direction different from a radial direction with respect to a center of the shot image, the second correction amount being calculated based on the first correction amount.

20. The image processing method according to claim 19, wherein the step of correcting the second chromatic aberration of magnification includes the step of correcting the second chromatic aberration of magnification by using the second correction amount of the shot image in each of a horizontal direction and a vertical direction, the second correction amount being calculated based on the first correction amount.

21. The image processing method according to claim 19, wherein the first correction amount at a first position and the first correction amount at a second position are different from each other, the first and second positions being symmetrical to the center of the shot image.

22. An image processing apparatus comprising:
   a first correction unit configured to correct a chromatic aberration of magnification of a shot image;
   a detection unit configured to detect a first region in which a level of at least one of a color signal and a brightness signal of the shot image in which the chromatic aberration of magnification has been corrected monotonically increases or monotonically decreases in a first direction within a predetermined section;
   a determination unit configured to determine a second region in which color bleeding of an image pickup optical system occurs, based on optical information on the color bleeding and information on the first region; and
   a second correction unit configured to correct the shot image in which the chromatic aberration of magnification has been corrected, so as to reduce the color bleeding,
   wherein the optical information is information on a second direction in which the color bleeding of the image pickup optical system occurs, and
   wherein the determination unit is configured to compare the first direction with the second direction to determine the second region.

23. An image pickup apparatus comprising:
   an image pickup element configured to photoelectrically convert an optical image to output a shot image;
   a first correction unit configured to correct a chromatic aberration of magnification of the shot image;
   a detection unit configured to detect a first region in which a level of one of a color signal and a brightness signal of the shot image in which the chromatic aberration of magnification has been corrected monotonically increases or monotonically decreases in a first direction within a predetermined section;
   a determination unit configured to determine a second region in which color bleeding of an image pickup optical system occurs, based on optical information on the color bleeding and information on the first region; and
   a second correction unit configured to correct the shot image in which the chromatic aberration of magnification has been corrected, so as to reduce the color bleeding,
   wherein the optical information is information on a second direction in which the color bleeding of the image pickup optical system occurs, and
   wherein the determination unit is configured to compare the first direction with the second direction to determine the second region.

24. A non-transitory computer-readable storage medium storing an image processing program configured to cause a computer to execute a process comprising the steps of:
   correcting a chromatic aberration of magnification of a shot image;
   detecting a first region in which a level of at least one of a color signal and a brightness signal of the shot image in which the chromatic aberration of magnification has been corrected monotonically increases or monotonically decreases in a first direction within a predetermined section;
   determining a second region in which color bleeding of an image pickup optical system occurs, based on optical information on the color bleeding and information on the first region; and
   correcting the shot image in which the chromatic aberration of magnification has been corrected, so as to reduce the color bleeding,
   wherein the optical information is information on a second direction in which the color bleeding of the image pickup optical system occurs, and
   wherein the determination unit is configured to compare the first direction with the second direction to determine the second region.

* * * * *